US009400876B2

(12) United States Patent
Hirai et al.

(10) Patent No.: US 9,400,876 B2
(45) Date of Patent: Jul. 26, 2016

(54) CONTENT DATA MANAGEMENT SYSTEM AND METHOD

(75) Inventors: Tatsuya Hirai, Kanagawa (JP); Yukihide Inagaki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 1575 days.

(21) Appl. No.: 12/288,954

(22) Filed: Oct. 24, 2008

(65) Prior Publication Data

US 2009/0132820 A1 May 21, 2009

(30) Foreign Application Priority Data

Oct. 24, 2007 (JP) .................................. 2007-276479

(51) Int. Cl.
- *G06F 15/16* (2006.01)
- *G06F 21/31* (2013.01)
- *H04L 9/00* (2006.01)
- *H04L 9/08* (2006.01)

(52) U.S. Cl.
CPC ........ *G06F 21/31* (2013.01); *H04L 9/00* (2013.01); *H04L 9/0816* (2013.01); *H04L 9/0891* (2013.01); *H04L 9/0894* (2013.01); *H04L 9/0897* (2013.01)

(58) Field of Classification Search
CPC ......... G06F 21/31; H04L 9/00; H04L 9/0816; H04L 9/0891; H04L 9/0894; H04L 9/0897
USPC ........................................................ 713/169
See application file for complete search history.

(56) References Cited

U.S. PATENT DOCUMENTS

| | | | | | |
|---|---|---|---|---|---|
| 5,182,770 | A | * | 1/1993 | Medveczky | G06F 21/123 340/5.74 |
| 5,799,086 | A | * | 8/1998 | Sudia | G06Q 20/02 380/286 |
| 6,169,802 | B1 | * | 1/2001 | Lerner | H04L 9/0891 380/44 |
| 6,249,585 | B1 | * | 6/2001 | McGrew | H04L 9/0841 380/286 |

(Continued)

FOREIGN PATENT DOCUMENTS

| | | |
|---|---|---|
| JP | 2004-007533 | 1/2004 |
| JP | 2004-302701 | 10/2004 |

(Continued)

*Primary Examiner* — Krista Zele
*Assistant Examiner* — Anthony Fabbri
(74) *Attorney, Agent, or Firm* — Zilka-Kotab, PC

(57) ABSTRACT

Embodiments of the present invention provide a simplified authentication transaction for reconnecting a storage device to a host apparatus that has completed authentication in the past. According to one embodiment, an authentication log is recorded in the host. Plural units of this log information are recorded in the storage device. At the time of transferring a content decryption key and usage rules between the host and the storage device, the decryption key and usage rules are recorded into the host as a log for the transfer. The used authentication log is recorded into the storage device as RAPDI. If RAPDI indicates the authentication log in the simplified authentication transaction, recovery transaction is permitted. The host device deletes/invalidates or holds the log for the transfer in accordance with non-permission/permission. In the case of permission, the key and usage rules are recovered by using a log for the transfer prior to the simplified authentication transaction.

12 Claims, 21 Drawing Sheets

(56) References Cited

U.S. PATENT DOCUMENTS

| | | | | |
|---|---|---|---|---|
| 6,711,264 | B1* | 3/2004 | Matsumoto | H04L 9/0891 380/277 |
| 6,898,708 | B2* | 5/2005 | Hori | G06F 21/10 705/59 |
| 6,999,948 | B1* | 2/2006 | Hatanaka | G06F 21/10 380/200 |
| 7,835,528 | B2* | 11/2010 | Bajko | H04L 63/067 380/277 |
| 2001/0050990 | A1* | 12/2001 | Sudia | G06Q 20/02 380/286 |
| 2002/0076044 | A1* | 6/2002 | Pires | H04L 9/0891 380/37 |
| 2003/0012387 | A1* | 1/2003 | Gilbert | H04L 9/14 380/286 |
| 2003/0126464 | A1* | 7/2003 | McDaniel | G06F 21/604 726/4 |
| 2003/0188182 | A1* | 10/2003 | Sato | H04N 5/783 713/193 |
| 2004/0250092 | A1* | 12/2004 | Hori | G06F 21/10 713/189 |
| 2005/0195975 | A1* | 9/2005 | Kawakita | H04L 9/0822 380/30 |
| 2005/0232427 | A1* | 10/2005 | Konersmann | H04L 63/0428 380/277 |
| 2005/0271210 | A1* | 12/2005 | Soppera | H04L 9/0836 380/277 |
| 2006/0034456 | A1* | 2/2006 | McGough | H04L 9/0844 380/30 |
| 2007/0127719 | A1* | 6/2007 | Selander | H04L 9/0861 380/277 |
| 2007/0165440 | A1* | 7/2007 | Hirai | H04L 9/3273 365/63 |
| 2007/0168663 | A1* | 7/2007 | Hirai | G06F 21/445 713/169 |

FOREIGN PATENT DOCUMENTS

| | | |
|---|---|---|
| JP | 2007-096783 | 4/2007 |
| JP | 2007-096817 | 4/2007 |
| WO | WO 01/13358 | 2/2001 |
| WO | WO 01/43339 | 6/2001 |

* cited by examiner

Fig.3

| SYMBOL | NAME | KEY ATTRIBUTE | CHARACTERISTIC |
|---|---|---|---|
| A ‖ B | DATA CONNECTION | - | CONNECTION OF DATA A AND DATA B |
| E (X,Y) | ENCRYPTION | - | CALCULATION TO ENCRYPT DATA Y WITH DATA X. PUBLIC KEY ENCRYPTION IF X IS PUBLIC KEY, AND SYMMETRIC KEY ENCRYPTION IF X IS SYMMETRIC KEY. |
| D (X,Y) | DECRYPTION | - | CALCULATION TO DECRYPT DATA Y WITH DATA X. DECRYPTION BY SECRET KEY OF DATA ENCRYPTED BY PUBLIC KEY IF X IS SECRET KEY, AND DECRYPTION BY SYMMETRIC KEY OF DATA ENCRYPTED BY SYMMETRIC KEY IF X IS SYMMETRIC KEY. |
| H (X) | HASH VALUE CALCULATION | - | CALCULATION TO FIND HASH VALUE OF DATA X |
| DCC | DEVICE CLASS CERTIFICATE | - | CERTIFICATE SHOWING VALIDITY OF KPdc. CONTAINS DIGITAL SIGNATURE ENCRYPTED BY $K_{CA}$. |
| RDCL | DEVICE CLASS CERTIFICATE INVALIDATION LIST | - | LIST OF DEVICE CLASS CERTIFICATE INVALIDATED BY CERTIFICATE AUTHORITY, RECORDED IN PROTECTED INFORMATION STORAGE AND USAGE PASS TRANSFER MODULE |
| RDCL.D | ISSUE DATE AND TIME OF DEVICE CLASS CERTIFICATE INVALIDATION LIST | - | INFORMATION DESCRIBED IN DEVICE CLASS CERTIFICATE INVALIDATION LIST. INFORMATION OF DATE AND TIME WHEN DEVICE CLASS CERTIFICATE INVALIDATION LIST IS ISSUED. |
| $KP_{CA}$ | CERTIFICATE AUTHORITY PUBLIC KEY | PUBLIC KEY | PUBLIC KEY ISSUED BY CERTIFICATE AUTHORITY, EMBEDDED IN PROTECTED INFORMATION STORAGE. USED FOR DECRYPTING OF DIGITAL SIGNATURE PART OF DEVICE CLASS CERTIFICATE. |
| $K_{CA}$ | CERTIFICATE AUTHORITY SECRET KEY | SECRET KEY | SECRET KEY MANAGED BY CERTIFICATE AUTHORITY. USED FOR ENCRYPTION OF DIGITAL SIGNATURE PART OF DEVICE CLASS CERTIFICATE. |
| $KP_{dc}$ | DEVICE CLASS PUBLIC KEY | PUBLIC KEY | PUBLIC KEY EMBEDDED INTO PROTECTED INFORMATION STORAGE. VALIDITY OF DEVICE IN WHICH THIS KEY IS EMBEDDED IS SHOWN BY DEVICE CLASS CERTIFICATE CONTAINING THIS KEY. ONE SUCH KEY CAN BE EMBEDDED INTO PLURAL DEVICES. |
| $K_{dc}$ | DEVICE CLASS SECRET KEY | SECRET KEY | SECRET KEY EMBEDDED INTO PROTECTED INFORMATION STORAGE. USED FOR DECRYPTING DATA ENCRYPTED BY USING $KP_{dc}$. |
| $KP_d$ | DEVICE PUBLIC KEY | PUBLIC KEY | PUBLIC KEY EMBEDDED INTO PROTECTED INFORMATION STORAGE. UNIVOCAL KEY IS EMBEDDED INTO ALL DEVICES. |
| $K_d$ | DEVICE SECRET KEY | SECRET KEY | SECRET KEY EMBEDDED INTO PROTECTED INFORMATION STORAGE. USED FOR DECRYPTING DATA ENCRYPTED BY $KP_d$. |
| $^*KP_x$ | SHARED DEVICE PUBLIC KEY | SYMMETRIC KEY | x REPRESENTS dc OR d. SYMMETRIC KEY GENERATED IN THE PROCESS OF ENCRYPTION USING PUBLIC KEY. |
| $^*K_x$ | SHARED DEVICE SECRET KEY | SYMMETRIC KEY | x REPRESENTS dc OR d. SYMMETRIC KEY GENERATED IN THE PROCESS OF DECRYPTION USING SECRET KEY. SAME VALUE AS $^*KP_x$. |
| $K_{ch}$ | CHALLENGE KEY | SYMMETRIC KEY | TEMPORARY SYMMETRICAL ENCRYPTION KEY (SYMMETRIC KEY) THAT IS DYNAMICALLY GENERATED IN USAGE PASS TRANSFER MODULE. USED FOR ENCRYPTING TEMPORARY SYMMETRICAL KEY (SESSION KEY) FOR ENCRYPTING USAGE PASS. |
| $K_s$ | SESSION KEY | SYMMETRIC KEY | TEMPORARY SYMMETRICAL ENCRYPTION KEY (SYMMETRIC KEY) THAT IS DYNAMICALLY GENERATED IN USAGE PASS TRANSFER MODULE. USED WHEN ENCRYPTING THE DATA AT THE TIME OF USAGE PASS TRANSFER. $0^{TH}$-ORDER SESSION KEY IS SHARED BY PRIMAL DEVICE AND INCEPTIVE DEVICE IN CONNECTION PROCEDURE. |
| $K_c$ | CONTENT KEY | SYMMETRIC KEY | USED FOR ENCRYPTION AND DECRYPTION OF CONTENT DATA |
| [P] | GENERATION OF PRIMAL DEVICE (SUBSCRIPT) | - | REFERS TO DATA GENERATED IN PRIMAL DEVICE. PRIMAL DEVICE REFERS TO DEVICE THAT VALIDATES DEVICE CLASS CERTIFICATE SENT FROM ANOTHER DEVICE AND THEREBY STARTS CONNECTION ESTABLISHING PROCESS. |
| [I] | GENERATION OF INCEPTION DEVICE (SUBSCRIPT) | - | REFERS TO DATA GENERATED IN INCEPTIVE DEVICE. INCEPTIVE DEVICE REFERS TO DEVICE THAT TRANSMITS ITS DEVICE CLASS CERTIFICATE TO ANOTHER DEVICE AND THEREBY STARTS CONNECTION ESTABLISHING PROCESS. |
| IV | INITIAL VECTOR | - | PARAMETER AT THE TIME OF CARRYING OUT SYMMETRIC KEY ENCRYPTION IN CBC MODE |

Fig.4

| | |
|---|---|
| Usage Pass Format | ~400 |
| Usage Pass Identifier | ~401 |
| Usage Rule enforced in Storage Module<br>Generation Count or Copy Count or Play Count & Reserved area | ~402 |
| Cipher Information of Content (including Content Key and reserved area) | ~403 |
| Usage Rule enforced in Playback Module<br>Service dependent control information and & Reserved area | ~404 |
| Content Identifier | ~405 |
| Copyright Information | ~406 |

Fig.5

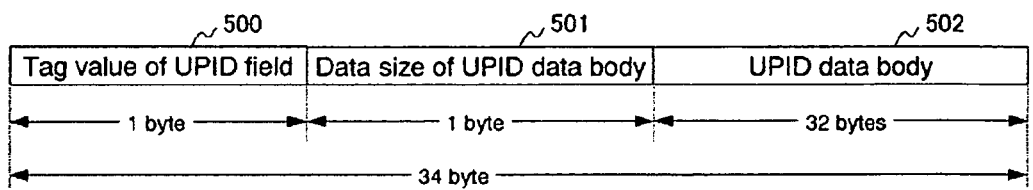

Fig.12

Field structure of an entry of Connection Log
for Storage Device

| | |
|---|---|
| Device Public Key (Sent from Partner Device) | 1200 |
| 0th order Session Key (Generated in Partner Device) | 1201 |
| 0th order Session Key (Generated in itself) | 1202 |
| Acceptable Usage Pass Type Map (Sent from Partner Device) | 1203 |
| Partner Device Generation Number | 1204 |
| Host Security Manager Specifier (ex. Serial Number of Device Class Certificate) *Recorded only in Storage Security Module | 1205 |

Fig.13

Field structure of an entry of Transaction Log

| | |
|---|---|
| Usage Pass Identifier | 1300 |
| Transfer Type (Source or Destination) | 1301 |
| Original Usage Rule enforced in Storage Module (when Host Device is Destination) | 1302 |
| Original Usage Pass (when Host Device is Source) | 1303 |
| Usage Pass Location (Recorded address when Host Device is Destination / Address to be written into when Host Device is Source) | 1304 |

Fig. 23

UP Inquiry Stage

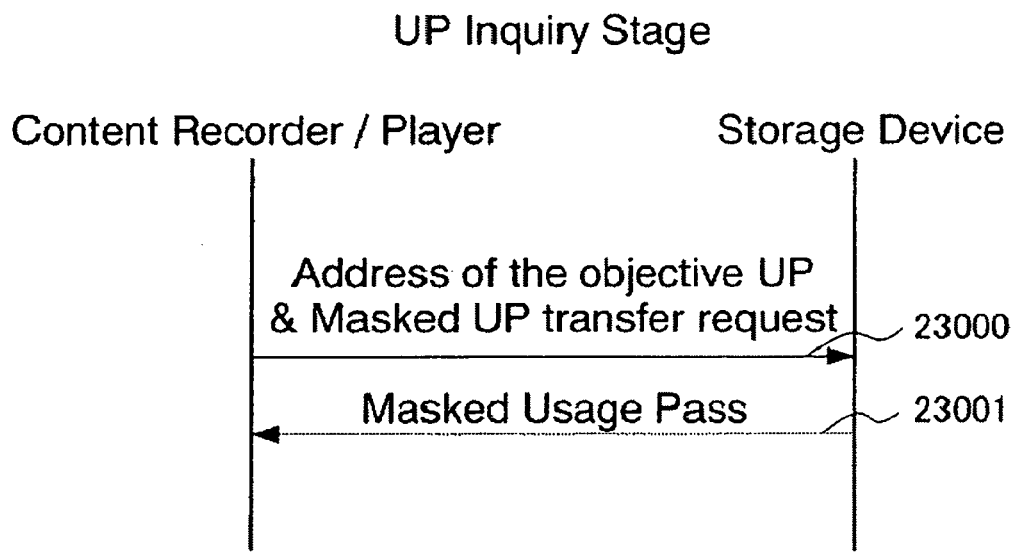

Fig. 24

Field structure of an entry of Transaction Log

| | |
|---|---|
| Usage Pass Identifier | 2400 |
| Transfer Type (Source or Destination) | 2401 |
| Original Usage Rule enforced in Storage Module (when Host Device is Destination) | 2402 |
| Original Usage Pass (when Host Device is Source) | 2403 |
| Usage Pass Location (Recorded address when Host Device is Destination / Address to be written into when Host Device is Source) | 2404 |
| 0th order Inceptive (or Primal) Session Key | 2405 |

CONTENT DATA MANAGEMENT SYSTEM AND METHOD

CROSS-REFERENCE TO RELATED APPLICATION

The instant nonprovisional patent application claims priority to Japanese Patent Application No. 2007-276479 filed Oct. 24, 2007 and which is incorporated by reference in its entirety herein for all purposes.

BACKGROUND OF THE INVENTION

In the case where copyright exists on content data such as music data and image data, the right of the copyright holder may be infringed if appropriate measures for copyright protection have not been taken. On the other hand, if top priority is given to the aim of copyright protection and distribution of content data is obstructed, it may be rather disadvantageous to the copyright holder who may collect royalties when a work is duplicated.

Distribution of content data that is a subject of copyright protection is executed mainly through a digital communication network, broadcast waves and so on. When a user uses these data, it is often the case that the data are once recorded in a certain type of storage medium and then reproduced by a reproducing apparatus. At present, a Hard Disk Drive (HDD) is known as a storage device having a large capacity and a control function with high access performance.

The magnetic disk device is mainly equipped in a recording and playback apparatus fixedly. However, portable types with a copyright protection function have come to exist.

As an apparatus for reproducing data, a recording and playback apparatus used at the time of receiving the distribution of such data, or a portable dedicated reproducing apparatus is used. In a recording and playback apparatus to which a portable storage device can be connected, in order to protect the copyright of data recorded in the storage device, it is important to provide security measures for the recording and playback apparatus and the storage device so that the data recorded in the storage device cannot be reproduced over the range of conditions claimed by the copyright holder. When providing security measures for the device, it is necessary to prevent free access to data in the form of plaintext with respect to transmission and reception of data executed in an area that is freely accessible from within and outside of the device, by carrying out an authentication transaction between devices that transmit and receive the data or by performing encryption processing and so on to the data itself. Meanwhile, as authentication transactions and encryption processing become stricter, more processing is required from the issue of a data use request by the user until the data can actually become available. As a result, there can be a situation where the data cannot be smoothly reproduced.

To deal with such problems, Japanese Patent Publication No. 2007-96783 ("Patent Reference 1") and Japanese Patent Publication No. 2007-96817 ("Patent Reference 2") present one solution.

These references describe features such that (1) digital data to be used is encrypted and recorded into an area that can be normally accessed in the storage device, (2) a special access area where key data for decrypting the digital data, and key data output conditions from the storage device and reproduction and drawing conditions for a decrypted content (these are collectively referred to as usage rule data) cannot be acquired or falsified in an unauthorized manner is provided in the storage device and the key data and usage rules are recorded there, and (3) a special procedure (protocol) is used to transfer the key data and usage rule data between the recording and playback apparatus and the storage device and to access the key data and usage rule data recorded in the storage device. As for the special procedure, two types of methods are described.

Also, International Patent Publication WO 01/0133358 ("Patent Reference 3") and International Patent Publication WO 01/043339 ("Patent Reference 4") propose measures to protect copyrights by encrypting digital data to be used and preventing unauthorized falsification of a key for executing decryption of the digital data and usage rule information of the decrypted digital data.

Japanese Patent Publication No. 2004-302701 ("Patent Reference 5") discloses a technique related to a storage device in which, in order to improve tamper-resistance at the time of encrypting data to be concealed and inputting and outputting the data between a storage device and a host apparatus, processing of plural encryption inputs and outputs sent from the host apparatus is divided into plural procedures and processed in parallel.

Also, Japanese Patent Publication No. 2004-7533 ("Patent Reference 6") discloses a technique for reducing load at the time of accessing encrypted content data.

The two types of management and inter-device transfer methods for key data and usage rule data, described in Patent References 1 and 2, are effective in such a case that a server apparatus or a dynamic image recording and playback device situated at a remote location and a storage device having a control unit therein such as Hard Disk Drive are connected to each other and digital content data that needs protection is transferred. Particularly, in the case where the main object is to provide a service of recording and playback digital television contents, if the host apparatus and the storage device are connected in a BT mode (Bidirectional Transfer) and key data and usage rule data are transferred between these devices, the load of transaction that needs to be executed by the storage device with respect to these data can be restrained to a low level and it is extremely effective. The feature will be described specifically. The following three points can be given.

(1) When authentication transaction (Connection Stage) is executed between a host apparatus and a storage device that are connected to each other for the first time, an authentication log (Connection Log) is recorded. In the next and subsequent authentication transaction, authentication (Reconnection Stage) can be completed by simplified transaction using the information recorded in the log.

(2) In the process of transfer of key data and usage rule data, recording of a process proceeding log (Transaction Log) to enable restoration in the case where these data are lost is not executed in the storage device.

(3) In order to prevent unauthorized duplication and restoration of key data and usage rule data, only one entry is provided in the storage device where the Connection Log may be recorded.

As a conclusion of (3) of the above points, there is a problem that even in the case where a storage device is connected again to a host apparatus to which the storage device has been connected in the past, if the storage device is temporarily connected to another host apparatus and then reconnected to the former host apparatus, authentication cannot be completed in the Reconnection Stage. Embodiments of the present invention may solve such problems.

In the case of reconnecting a storage device to a host to which it has already been connected (authentication transaction is completed), if Reconnection is to be made after the storage device is connected temporarily to another host (authentication transaction is completed), simplified authentication transaction cannot be executed.

BRIEF SUMMARY OF THE INVENTION

Embodiments of the present invention provide a simplified authentication transaction for reconnecting a storage device to a host apparatus that has completed authentication in the past. According to one embodiment, an authentication log is recorded in the host. Plural units of this log information are recorded in the storage device. At the time of transferring a content decryption key and usage rules between the host and the storage device, the decryption key and usage rules are recorded into the host as a log for the transfer. The used authentication log is recorded into the storage device as RAPDI. If RAPDI indicates the authentication log in the simplified authentication transaction, recovery transaction is permitted. The host device deletes/invalidates or holds the log for the transfer in accordance with non-permission/permission. In the case of permission, the key and usage rules are recovered by using a log for the transfer prior to the simplified authentication transaction.

BRIEF DESCRIPTION OF THE DRAWINGS

FIG. 3 is a table showing data, information, symbols and so on used in an example.

FIG. 4 is a configuration view of data (Usage Pass) in which data decryption conditions and decryption key used in an example are collectively shown.

FIG. 5 is a structural view of a UPID field of data (Usage Pass) shown in FIG. 4 that is used in an example.

FIG. 12 is a structural view of log information of mutual authentication transaction recorded in the BT mode in a recorder/player and a storage device according to an example.

FIG. 13 is a structural view of log information of Usage Pass transfer transaction recorded in the BT mode in a recorder/player according to an example.

FIG. 23 is a view showing a process sequence in which a storage device sends back information contained in Usage Pass except for a content key, to Host Module in a recorder/player in an example.

FIG. 24 is a structural view of log information of transfer transaction of Usage Pass recorded in the BT mode in a recorder/player according to an example.

DETAILED DESCRIPTION OF THE INVENTION

Figure 1:
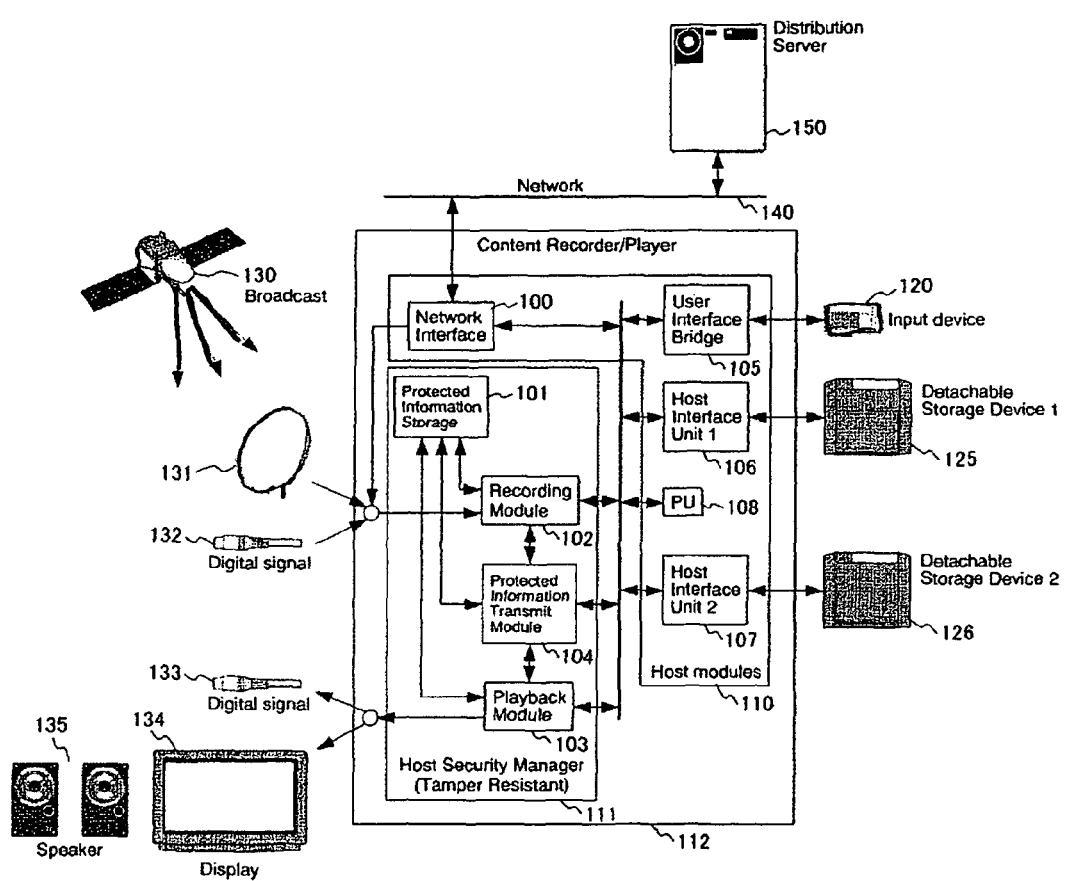
FIG. 1 is a schematic configuration view showing a data protection system including a recorder/player to which an example of an embodiment of the invention is applied.

Embodiments of the present invention relate to a content data management system and method, and more particularly to a system and method for recording and playback encrypted content data.

A content data management system and its method according to embodiments of the present invention includes a host apparatus (recording and playback apparatus) which has a first authentication log (Connection Log) storing information including authentication key data used for mutual authentication with a first connection destination device (storage device), and a log for the transfer (Transaction Log) that stores predetermined information prior to transfer to the first connection destination device of predetermined information including key data for decrypting encrypted content data and a usage rule for the content data in association with one entry of this first authentication log, in order to restore the predetermined information in the case where the predetermined information is lost in the process of the transfer. In order to mutually authenticate again with the first connection destination device after execution of predetermined authentication transaction and transfer transaction of predetermined information, the host apparatus transmits information specifying a storage location of one entry of an authentication log corresponding to a content stored in one entry of the first authentication log stored in the first connection destination device, to the first connection destination device, and then transfers the predetermined information stored in the log for the transfer associated with the content stored in one entry of the authentication log used for the execution of re-authentication transaction in response to a permission (Recovery Permission indicator) from the first connection destination device. Embodiments of the system and method also include a storage device as the first connection destination device having a storage medium storing encrypted content data, and a second authentication log that stores information including authentication key data for mutual authentication with each of plural connection destination devices including the host apparatus, in association with the plural connection destination devices. When information specifying a storage location of one entry of an authentication log corresponding to a content stored in one entry of the first authentication log from the host apparatus indicates a storage location of one entry of a second authentication log corresponding to one device that has executed transfer transaction of predetermined information including the latest key data and usage rule, of the plural connection destination devices (Recovery Allowed Primal Device Indicator), the storage devices responds to the host apparatus with a permission to restore the predetermined information in the case where the predetermined information is lost in the process of transfer transaction.

According to another aspect of embodiments of the invention, the storage device has an area where information indicating the storage location of one entry of the second authentication log corresponding to the one host apparatus that has executed transfer transaction of predetermined information including the latest key data and usage rule, of the plural connection destination devices, is stored.

According to still another aspect of embodiments of the invention, the storage device stores information indicating that it is the one device that has executed the latest transfer transaction, at each entry of the second authentication log corresponding to the one host apparatus that has executed transfer transaction of predetermined information including the latest key data and usage rule, of the plural connection destination devices.

According to embodiments of the present invention, in the case of reconnecting a storage device to a host apparatus that has completed authentication in the past, authentication may be completed by simplified authentication transaction (Reconnection Stage). Thus, convenience for the user may be improved.

Hereinafter, embodiments of the invention will be described with reference to the drawings.

One example has characteristics as follows. That is:

(1) Digital data that needs protection is encrypted;

(2) Use of the digital data is controlled by key data for decrypting the encrypted digital data and usage rule data in which a usage rule of the digital data is described;

(3) In the case where the key data and the usage rule data described in (2) are recorded in a medium, the medium is an area that a user cannot freely access;

(4) Between a functional unit situated in a host apparatus or in a server at a remote location and having a function of generating the key data and the usage rule data described in (2) and transmitting these data to a storage device, and a functional unit situated in the storage device and having a function of actually recording the received key data and usage rule data onto the medium, or between the functional unit in the storage device and a function unit that reads out the recorded key data and usage rule data and controls reproduction of the encrypted digital data, authentication transaction to mutually verify validity is executed and an encryption communication channel is consequently established; and (5) In the case of transferring the key data and the usage rule data described in (2), which is generated or recorded, between two functional units as described in (4), the data pass through the encryption communication channel as described in (4).

First, the system apparatus as a whole and Hard Disk Drive as an exemplary storage device will be described. After that, a method of transferring key data and usage rule data will be described.

Configuration of System Apparatus

Figure 2:
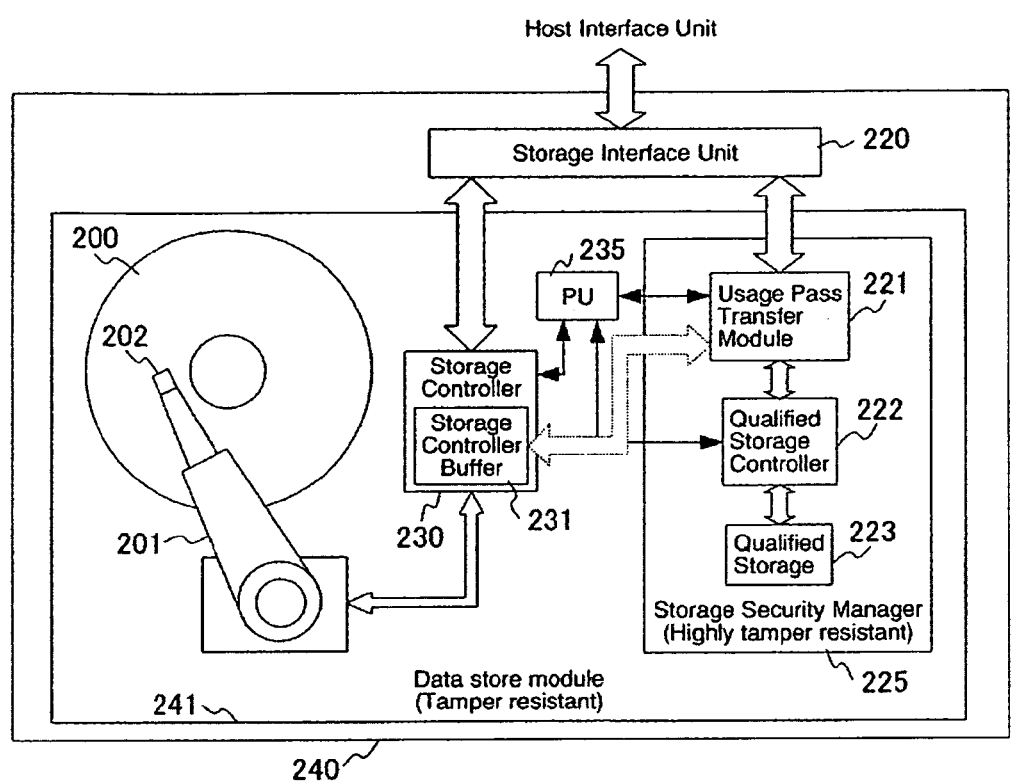
FIG. 2 is a configuration view of a detachable Hard Disk Drive according to an example.

Referring to FIG. 1 and FIG. 2, the overall configuration of a system including a data recording and playback apparatus (Content Recorder/Player) 112 in this example and a storage device that may be connected to the apparatus will be described. In this example, an exemplary application to a recording and playback system is described in which broadcast digital video data, digital data distributed from a distribution server 150 and digital data transmitted via Digital Signal 132 connected to another device are recorded to Detachable Storage Devices or Storage Services 125 and 126 and reproduced by a display device 134, speakers 135 and so on of the recording and playback apparatus 112.

Hereinafter, the digital data recording and playback apparatus 112 is simply referred to as a recorder/player, and digital data such as video, music and texts received by the recorder/player 112 are referred to as content data. Here, the detachable storage devices 125 and 126 for recording content data are, for example, Hard Disk Drives, semiconductor memory devices and so on. Each of these has a control function that is characteristic of this example. In the following, an example where the storage devices 125 and 126 are Hard Disk Drives will be described. However, the storage devices are not limited to this and may be applied to any other known storage device than the Hard Disk Drive as long as it has the characteristic function of this example as described below.

Content data that requires copyright protection is taken into the recorder/player 112 as it is received by an antenna 131 via broadcast waves, or distributed from the distribution server 150 and received via Network Interface 100. The distributed content data is encrypted by a predetermined encryption system at a broadcast wave transmission source (broadcast) 130 or the distribution server 150. The encryption system may be uniquely prescribed in accordance with content protection specifications of each. In this case, also key data for decrypting content data (hereinafter referred to as a content key) and a usage rule for the content data are separately transmitted to the recorder/player 112. Information for controlling the decryption and use of these content data is hereinafter referred to as use control information of content data. The use control information may be transmitted from the same transmission source as the transmission source of the content data or may be transmitted from another transmission source.

The recorder/player 112 has a configuration that enables detachable storage devices, for example, the Hard Disk Drives 125 and 126, to be connected thereto. To the Hard Disk Drives 125 and 126, encrypted content data and use control information of the content data, transmitted via broadcast waves or transmitted from the distribution server 150, are recorded via Recording Module 102 and Protected Information Transmit Module 104. To Playback Module 103, encrypted content data and decrypting control information of the content data are transmitted via the Protected Information Transmit Module 104 from the detachable Hard Disk Drives 125 and 126. The decryption and reproduction of content data is executed at the Playback Module 103 in the recorder/player 112.

To prevent unauthorized use of content data, it may be necessary to prevent unauthorized take-out of the content key included in the use control information and unauthorized duplication and rewriting of the usage rule. To this end, it is important the parts that transmit and receive the use control information and that record and read out information in the recorder/player 112 and the detachable Hard Disk Drives 125 and 126 are so installed as to have tamper-resistance. Such parts include Host Security Manager 111 in the recorder/player 112 and Storage Security Manager 225 in Hard Disk Drive (FIG. 2) 240. The role of Protected Information Storage 101 in the Host Security Manager 111 and specific roles of Usage Pass Transfer Module 221, Qualified Storage Controller 222 and Qualified Storage 223 in the Storage Security Manager 225 will be described later.

This example relates to a transfer protocol for mutually transmitting and receiving use control information between the modules in the Host Security Manager 111 and the Storage Security Manager 225. Here, means for realizing the function of each module in the recorder/player 112 and the Hard Disk Drives 125 and 126, and the security managers, may be formed by either hardware or software (program).

Meanwhile, in the recorder/player 112, the Network Interface 100 to the network, User Interface Bridge 105 to Input device 120, interfaces (Host Interface Units 1, 2) 106 and 107 to the Hard Disk Drives, a processor (PU) 108 that controls these units and the like have, as a whole, the function of controlling transaction and delivery of data flowing within the system. In that sense, hereinafter, these units are collectively referred to as Host Modules 110.

Configuration of Hard Disk Drive

Referring to FIG. 2, an outline of the configuration of the Hard Disk Drive will be described. In the Hard Disk Drive 240, in the case where data that requires no particular protection, except for use control information with its data inputted and outputted via Storage Interface Unit 220, is inputted from outside, the data is recorded via a controller 230 onto a magnetic disk 200 from a head unit 202. Encrypted content data follows this flow, too, and is recorded onto the magnetic disk 200. In the case of reading out, the data flows backward as opposed to the above. The Storage Controller 230 is also controlled from a processor (PU) 235. The Usage Pass Transfer Module 221, the Qualified Storage Controller 222 and so on are controlled by the processor 235 as well. The detailed behaviors of the Usage Pass Transfer Module 221 and the Qualified Storage Controller 222 will be described later.

Meanwhile, the Storage Security Manager 225, which is an entire module group that controls recording and transfer of data that requires protection such as use control information, needs to be installed to have high tamper-resistance. However, though the Qualified Storage 223 is provided separately from the magnetic disk 200 in FIG. 2, the Qualified Storage may be provided on the magnetic disk 200 as long as it has a configuration that only permits access by different special access methods between reading and writing of encrypted content data and that makes it impossible to disassemble this device and directly read out inner data or the like. In the case of such installation, it is necessary to implement special installation to provide tamper-resistance so that the behavior of the Storage Controller 230 cannot be changed from outside.

Fundamental Assumptions

Content data transmitted on broadcast waves, distributed data, or content data recorded on other media are generally encrypted by a uniquely prescribed system. Also, these data often contain information for controlling their use. In the case where the recorder/player 112 takes these data in via the antenna 131 or the digital signal line 132, the Recording Module 102 decrypts the content data in accordance with the prescribed system and takes out decryption control information. Meanwhile, the decrypted content data are often encrypted by an individual method for transmitting them to a storage device or for writing them to a medium. Here, if the use control information that is taken out is grouped into one data having a specific format together with the key data for decrypting the content data, there is an advantage that management of these data becomes easier. Hereinafter, this is called Usage Pass. However, the use control information need not necessarily be grouped into one. FIG. 4 shows an exemplary structure of Usage Pass.

As the Recording Module 102 generates Usage Pass, the Recording Module 102 transmits it to the Hard Disk Drive 125 or 126. However, to complete this transmission, mutual authentication must be completed prior to that between the Recording Module 102 or the Protected Information Transmit Module 104 and the Usage Pass Transfer Module 221. When the authentication transaction is completed, several key data are shared. Then, the Usage Pass as the transfer object is encrypted by using a shared key and then transmitted from the Recording Module 102 to the Usage Pass Transfer Module 221.

Transaction to transfer Usage Pass roughly includes the following two actions:

(1) authentication transaction to mutually confirm whether the device of the connecting party is valid or not; and (2) process to encrypt the Usage Pass by using a key that is shared in accordance with the authentication transaction, and to transfer the Usage Pass.

Various concrete methods exist on the above two stages. Hereinafter, the description is based on the Bidirectional Transfer (simply as BT mode) described in Patent Reference 1 and Patent Reference 2. However, the method is not limited to this. Embodiments of the present invention may be applied to authentication transaction, Transaction Log recording, and usage rule information transfer transaction that have the features (1) to (3) described in the background section.

Use control information such as the above BT mode is hereinafter collectively referred to as a Qualified Access mode. When transferring Usage Pass between modules, the host module 110 decides which Qualified Access mode is used to execute mutual authentication and transfer of use control information such as Usage Pass, at the time of starting the recorder/player. For the mutual authentication transaction, a digital signature generated on a public key encryption board is used. Also, in view of cryptography, it is appropriate to execute encryption of Usage Pass or a temporary key that is generated during the process, in a CBC (Cipher Block Chaining) mode by using a symmetric key cryptosystem. The encryption based on the CBC mode is described, for example, in "Network Security (published in Pearson Education)".

In the Hard Disk Drive, when the Usage Pass Transfer Module 221 has received Usage Pass, the Usage Pass Transfer Module 221 transmits the Usage Pass to the Qualified Storage Controller 222. The Qualified Storage Controller 222 is a module that controls the Qualified Storage 223. The Usage Pass itself is ultimately recorded into the Qualified Storage 223. In the case where the distribution server 150 transmits Usage Pass to the Hard Disk Drive or in the case where Usage Pass is transferred from one Hard Disk Drive to another Hard Disk Drive, the module that serves as the transfer source of the Usage Pass may directly transmit the Usage Pass to the Usage Pass Transfer Module in the Hard Disk Drive that serves as the transfer destination, in accordance with the system of this example. In this case, the Network Interface 100 and the Recording Module 102 in the recorder/player 112 only control the transfer of data from one module to the other module and do not directly take part in the transaction of mutual authentication and the encryption of the Usage Pass.

Configuration of Key and Data of System

FIG. 3 shows a list of key data used to encrypt Usage Pass, and distributed data and so on at the time of executing Usage Pass transfer between the Recording Module 102, the Playback Module 103 and the Usage Pass Transfer Module 221 in the device shown in FIG. 1 and FIG. 2. Usually, in the case where the key data X is key data for symmetrical encryption, the subject data is encrypted by using the key data X and its decryption is used by using the same key data X. On the other hand, in the case where the key data X is a secret key or public key for asymmetrical encryption, the data of the encryption subject is encrypted by using a public key or secret key Y that is different from X and corresponds to these. The data encrypted by using Y is decrypted by using X. Hereinafter, asymmetrical encryption public key data is simply referred to as a public key, asymmetrical encryption secret key data as a secret key, and symmetrical encryption key data as a symmetric key. In the case where a digital signature is appended to the data, it means that the Hash value of a data set including the data as a part of it is encrypted by the secret key Y corresponding to the public key X. The letter "x" described as in $K\_x$ in this specification is expressed as in the form of a subscript in all the drawings.

Keys related to encryption, decryption and playback of content data, encryption and decryption of Usage Pass, and authentication of the Recording Module 102, the Playback Module 103, the Hard Disk Drives 125 and 126, and the distribution server 150 include the following. The key to encrypt and decrypt content data is a content key $K\_c$. To each of the distribution server 150, the Recording Module 102, the Playback Module 103 and the Usage Pass Transfer Module 221, a public key $KP\_dc$ with a digital signature to individually authenticate each other is allocated. However, in the case where the Host Security Manager 111 is installed as a single tamper-resistant functional unit as a whole, one $KP\_dc$ may be allocated to the Host Security Manager 111.

Data encrypted by the public key $KP\_dc$ may be decrypted by a secret key $K\_dc$ corresponding to this. These secret key data are allocated in the manner of one for a certain finite number of units, with respect to each of the distribution server 150, the Recording Module 102, the Usage Pass Transfer Module 221 and the Playback Module 103. The finite number of units implies that it may be one or plural units. Units that share $KP\_dc$ and $K\_dc$ are called classes. For one class, the security level that the parts transferring and recording Usage Pass must meet at the time of installation and one Usage Pass transfer system are prescribed. That is, plural modules belonging to a certain class are installed in such a form that they meet the security level prescribed for that class, and they have the function to realize one common Usage Pass transfer method. Hereinafter, such devices and modules are generally called devices.

$KP\_dc$, after being connected with other general information, is given a digital signature from a predetermined certificate authority and plays the role of a certificate for each device. The public key of the certificate authority to give a digital signature is expressed as $KP\_CA$, and the secret key corresponding to this is expressed as $K\_CA$. Hereinafter, these are called certificate authority public key and certificate authority secret key. The general information described in the certificate includes the issue source of the certificate, the serial number of the certificate and so on. Hereinafter, a certificate to show validity of $KP\_dc$ is called Device Class certificate, the public key $KP\_dc$ is called Device Class public key, and the secret key used to decrypt data encrypted by the key is called Device Class secret key. The Device Class certificate and the Device Class secret key are embedded into each device at the time of shipment. To each device, a public key $KP\_d$ to be individually embedded and a secret key $K\_d$ for decrypting the data encrypted by the key are embedded, too. Hereinafter, these are called device public key and device secret key. Different device public keys and device secret keys are embedded into all devices. In the process of encryption by public keys, one symmetric key is generated on the basis of the public keys used for encryption. This is expressed as $*KP\_d$. Similarly, in the process of decryption by secret keys, one symmetric key is generated on the basis of the secret keys used for decrypting. This is expressed as $*K\_d$. The values of $*KP\_d$ and $*K\_d$ are consequently the same. Data encrypted by $*KP\_d$ may be decrypted by $*K\_d$. These symmetric keys are called shared device public key and shared device secret key, respectively. The method of generating these keys will be described in detail later in the description about a public key encryption method.

Moreover, keys used in the system shown in FIG. 1 include the following. They are a symmetric key $K\_sn$ ($n \geq 0$) generated mainly at the transfer destination of the Usage Pass in order to encrypt the Usage Pass every time Usage Pass transfer is executed between two different devices, and a symmetric key $K\_ch$ generated in order to encrypt $K\_s0$ that is shared by the two devices in the final stage of mutual authentication transaction between the devices. $K\_ch$ and $K\_s0$ are keys shared in the mutual authentication transaction between the devices and are not used to encrypt the Usage Pass at the time of Usage Pass transfer. Meanwhile, $K\_sn$ ($n \geq 1$) is always updated from $K\_sn$ to $K\_sn+1$ and then used every time Usage Pass transfer is executed. Hereinafter, $K\_ch$ is called Challenge key and $K\_sn$ ($n \geq 0$) is called Session key. Particularly when n is 0, the Session is called zero-order Session key.

Each key is given a subscript of [P], [I] or [S], [D] as in $K\_s[P]n$. This indicates whether the key data in question is generated (or embedded) at Primal Device or at Inceptive Device, or whether the key data is generated at the transfer source (Source) or the transfer destination (Destination) of the Usage Pass. Here, the Primal Device is a device that carries out verification of Device Class certificate transmitted from a partner device at the first process in the case where a device carries out mutual authentication with another device. On the other hand, the Inceptive Device is a device that carries out transmission of its own Device Class certificate to the partner device in the first process in a similar case.

Encryption executed by using the above-described keys is expressed as $E(X,Y)$. This indicates that data Y is encrypted by using key data X. Similarly, decryption is expressed as $D(X,Y)$. This indicates that data Y is decrypted by using key data X. $H(X)$ represents the Hash value of data X. $X \| Y$ indicates that data X and data Y are connected.

Method of Sharing Shared Device Public Key by Public Key Encryption

Before the explanation of a detailed process sequence of mutual authentication and Usage Pass transfer, a public key encryption used in this example will be described. In this example, the elliptic curve cryptosystem is used as a public key encryption. However, the encryption system should not be limited to this.

The elliptic curve cryptosystem utilizes the point of n-multiple of a fixed point on a curve expressed by an equation of a two-dimensional elliptic curve (this is referred to as a base point $G=(Gx,Gy)$), that is, calculation to add G for n times, in encryption. The addition used here is different from the ordinary addition method in the decimal system. The result of addition of G for an integral number of times is a point on the elliptic curve that is different from G.

In the explanation, two devices, that is, Device 1 and Device 2, are considered. It is assumed that a message M to be encrypted has been recorded in the Device 1 and that a secret key KPr to make one set together with a public key KPu has been recorded in the Device 2. Here, KPr is a natural number and KPu is a coordinate point (KPux,KPuy) on the elliptic curve. These two and the base point are connected in the relation of KPu=KPr×G. In other words, KPu is the point as a result of adding the base point KPr times.

First, encryption in the Device 1 will be described.

(E1) KPu is transmitted from the Device 2 to the Device 1.

(E2) A random natural number r is generated in the Device 1.

(E3) r×G=R=(Rx,Ry) is calculated.

(E4) r×KPu=P=(Px,Py) is calculated.

(E5) A natural number *KPu is generated using Px and Py: *KPu=f(Px,Py), where the function f may be arbitrary as long as it is determined in advance.

(E6) A message M as an encryption subject is symmetrically encrypted by using *KPu as a symmetric key: E(*KPu, M)

(E7) The data acquired in (E3) is connected to the data acquired in (E6) and then transmitted to the Device 2. The transmitted data is Rx∥Ry∥E(*KPu,M). Here, *KPu is called shared device public key.

Next, decryption in the Device 2 will be described.

(D1) P is calculated using Rx, Ry and KPr: KPr×R=KPr× r×G=r×(KPr×G)=r×KPu=P=(Px,Py)

(D2) *KPr is calculated using Px and Py. Here, *KPr and *KPu are perfectly the same number. The former indicates that it is acquired by using KPr, and it is expressed as *KPr: *KPr=f(Px,Py)

(D3) r×KPu=P=(Px,Py) is calculated.

(D4) Received data is symmetrically decrypted by using *KPr as a symmetric key: D(*KPr, E(*KPu,M)).

In this embodiment, this is described as D(KPr, E(KPu, M)). Here, *KPr is called shared device secret key. The above-described algorithms for sharing the symmetric keys *KPu and *KPr are generally called ECDH algorithms.

In this specification, encryption from the process E2 to the process E7 is described as E(KPu,M). In the case where *KPu has already been found and only process E6 is to be executed, it is described as E(*KPu,M). Similarly, decryption by carrying out all of process D1 to process D4 is described as D(KPr, E(KPu,M)). In the case where *KPr has already been found and only process D4 is to be executed, it is described as D(*KPr, E(*KPu,M)).

Structure of Usage Pass

The structure of Usage Pass will be described with reference to FIG. 4. Usage Pass includes Usage Pass Format (UPF) 400 indicating what kind of module it may make an output, Usage Pass Identifier (UPID) 401 each uniquely assigned, Usage Rules enforced in Storage Module (UR_s) 402 and Usage Rules enforced in Playback Module (UR_p) 404 for limiting the use of subject content data, Cipher Information of Content (CIC) 403 for managing encryption and decryption in this Usage Pass (including the content key K_c for encrypting and decrypting content data), Content Identifier (CID) 405 for specifying corresponding content data, and Copyright Information 406 of the content. UR_s 402 is information for interpreting the content at the transfer source of the Usage Pass and for controlling its output (the transfer source of the Usage Pass may usually be the Recording Module or the Hard Disk Drive). UR_p 404 is information for controlling decryption of content data at the Playback Module 103 after the Playback Module 103 receives the Usage Pass and content data. UR_s 402 includes Generation Count indicating information of duplicable generation(s), Copy Count indicating the number of times the Usage Pass may be duplicated from itself, Play Count indicating the number of times the content data may be decrypted by using its Usage Pass, and so on. It may take such a form that all these may be designated. However, in this example, in order to reduce load to interpret and process these values, only one of them may be selected. Meanwhile, UR_p is prescribed for each service and is used to describe control information that is unique to each service.

With respect to Usage Pass recorded in the storage device, as the recorder/player issues a command to refer to the Usage Pass, response is made for all the information except for CIC 403. This function enables the recorder/player to grasp the information of UPID, UR_s, UR_p and so on without encryption/decryption for transfer.

In each field, tag data that specifies each field and the size of data body are described together with the data body. As an example, the structure of the UPID field is shown in FIG. 5. The UPID field is formed by tag data 500, size of data body 501, and data body 502. The size of each field may be variable. However, if it has a fixed length, the information storage position is specified and there is an advantage that processing load at the time of searching for a target field may be reduced in each device.

Following UR_s 402, CIC 403 and UR_p 404, a reserved area is provided in order to enable addition of control information in the future without expanding the size of the entire Usage Pass.

Hereinafter, with respect to means for realizing Usage Pass transfer in the BT mode, the configuration of the Transfer Module and the procedures will be described with reference to FIGS. 6 to 20.

Figure 6:
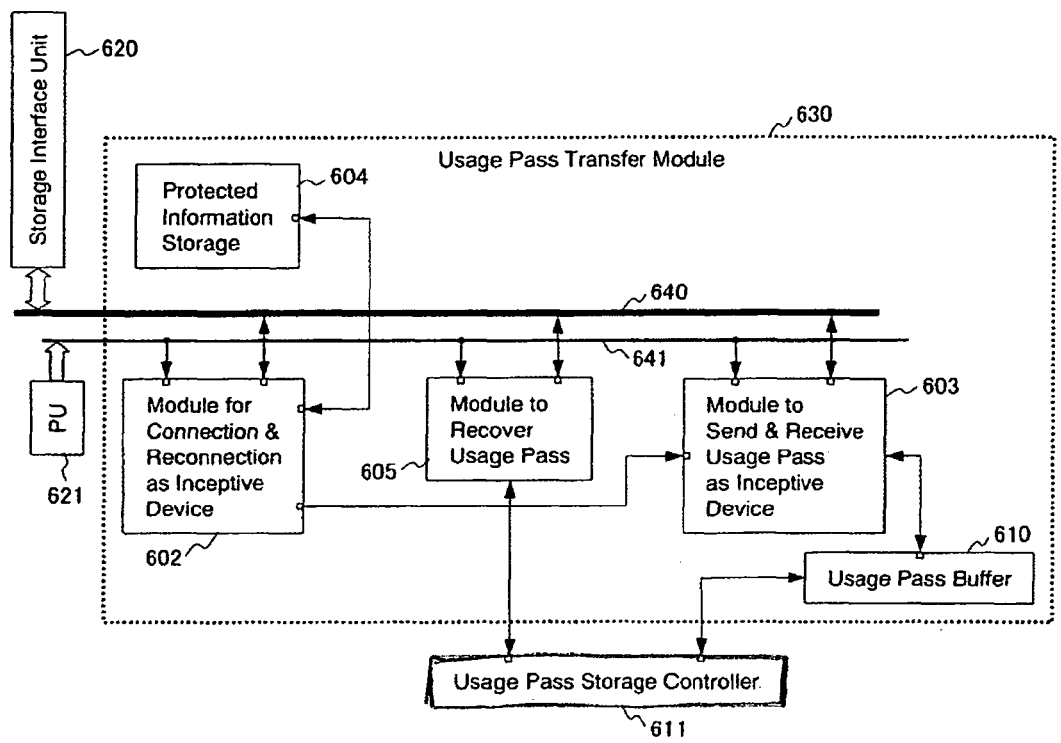
FIG. 6 is a view of Usage Pass Transfer Module that realizes a BT mode in Hard Disk Drive according to an example.

Configuration of Usage Pass Transfer Module Capable of Executing Usage Pass Transfer in BT Mode Referring to FIG. 6, the configuration of Usage Pass Transfer Module (221 in FIG. 2) capable of executing Usage Pass transfer in the BT mode will be described. In the BT mode, the Hard Disk Drive is constantly Inceptive Device. Thus, in Usage Pass Transfer Module 630, there is provided a module 602 having a function to execute necessary process as Inceptive Device in the case of performing mutual authentication with another device, a module 603 having a function to transfer Usage Pass as Inceptive Device, a static storage area 604 in which rewriting intended by the user cannot be executed, a module 605 having Usage Pass recovery function in order to avoid loss of a subject Usage Pass both from the transfer source Device and from the transfer destination Device in the case where process has not normally been completed when Usage Pass transfer is executed, and Usage Pass buffer 610 for temporarily storing Usage Pass before transmitting it to the Qualified Storage Controller 222 and for temporarily storing Usage Pass read out from the Qualified Storage unit. The static storage area 604 is also referred to as Protected Information Storage. The authentication module 602 accesses the storage area when necessary.

Communications of data between an external unit outside of the Hard Disk Drive and each module are executed via Storage Interface Unit 620 and a bus 640. A PU 621 is the same as the PU 235 in FIG. 2.

Figure 7:
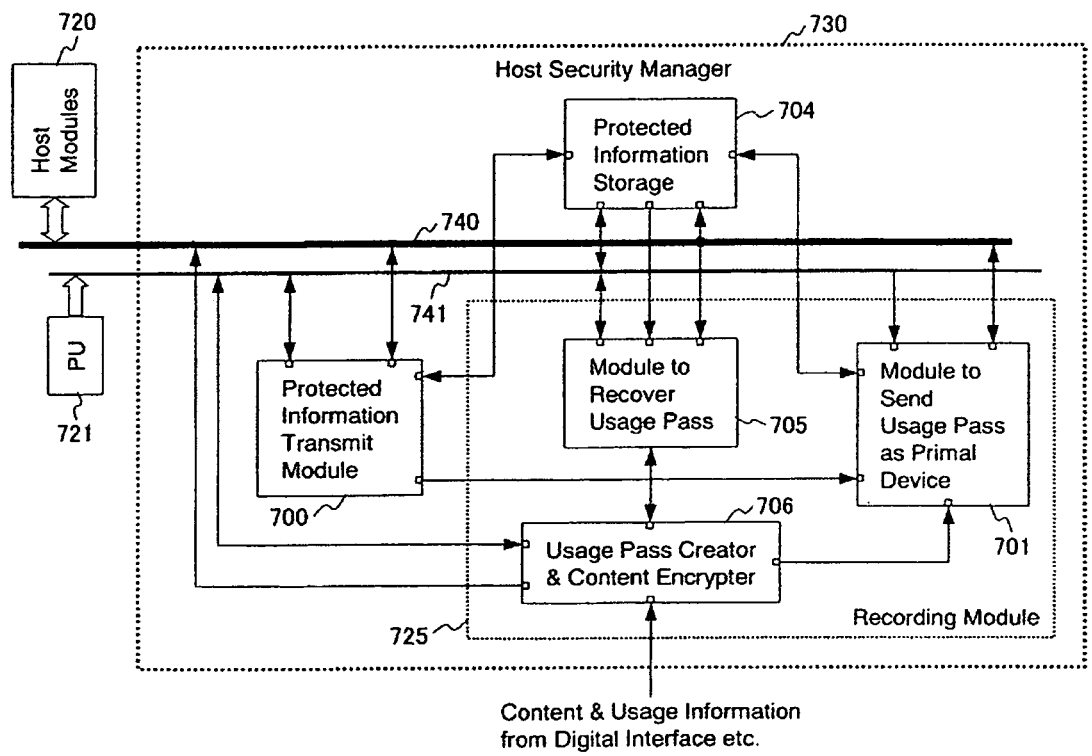
FIG. 7 is a configuration view of a dedicated recording functional module that realizes Usage Pass transmission in the BT mode in a recorder/player according to an example.

Configuration of Recording Module in Recorder/Player Capable of Executing Usage Pass Transmission in BT Mode Referring to FIG. 7, the configuration of Recording Module (102 in FIG. 1) capable of executing Usage Pass transmission in the BT mode will be described. In the BT mode, the entire Host Security Manager 111 constantly operates as Primal Device, and Usage Pass flows bidirectionally with respect to the Host Security Manager 111. Therefore, it is more appropriate to have a configuration in which Recording Module 725 includes only a necessary function to output Usage Pass while the Protected Information Transmit Module 104 includes functions to execute mutual authentication with Inceptive Device, and so on. Thus, in the Recording Module 725, there is provided a module 701 having a function to transmit Usage Pass as Primal Device, a module 705 having Usage Pass recovery function in order to avoid loss of a subject Usage Pass both from the transfer source device and from the transfer destination device in the case where process has not normally been completed when Usage Pass transmission process is executed, and a module 706 having functions to acquire content data and usage information from outside, generate a content key, encrypt the content with the key, and generate Usage Pass containing the key. The encrypted content data is sent from the module 706 to a data bus 740 and is recorded to the Hard Disk Drive via Host Module 720.

In Host Security Manager 730 including the Recording Module 725, a static storage area (Protected information storage) 704 is provided in which rewriting based solely on the user's intention cannot be executed. When Usage Pass reading or writing request transmitted from the Host Security Manager 111 is received, an authentication module (Protected Information Transmit Module) 700, the Usage Pass encryption and transmission module 701, the Usage Pass recovery module 705 and so on access this storage area during the execution of the prescribed processes. Hereinafter, the storage area 704 is referred to as Protected Information Storage.

The types and so on of data recorded in the Protected Information Storage 704 will be described later with reference to FIG. 10.

Figure 8:
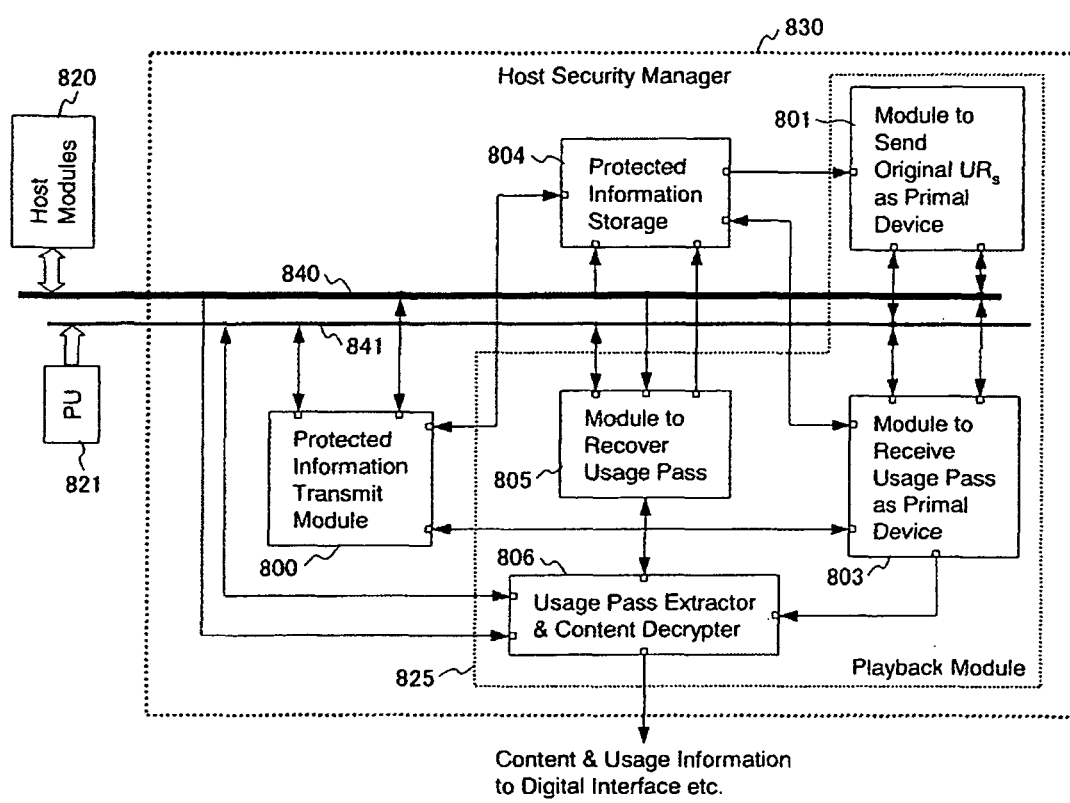
FIG. 8 is a configuration view of a dedicated decryption functional module that realizes Usage Pass reception in the BT mode in a recorder/player according to an example.

Configuration of Playback Module in Recorder/Player Capable of Executing Usage Pass Reception in BT Mode Referring to FIG. 8, the configuration of Playback Module (103 in FIG. 1) capable of executing Usage Pass reception in the BT mode will be described. In the BT mode, the Playback Module constantly operates as Primal Device, similarly to the Recording Module. As described in the explanation of the Recording Module, the Protected Information Transmit Module 104 is responsible for the function for the Host Security Manager as Primal Device to execute mutual authentication with Inceptive Device. Therefore, in Playback Module 825, there is provided a module 803 having a function to receive Usage Pass as Primal Device, modules 805 and 801 having Usage Pass recovery function in order to avoid loss of a subject Usage Pass both from the transfer source device and from the transfer destination device in the case where the transaction has not normally been completed when Usage Pass receiving transaction is executed, and a module 806 having functions to interpret the content described in UR_p included in the received Usage Pass and decrypt encrypted content data in accordance with this. At this time, the encrypted content data is transmitted to the module 806 via Host Module 820 and a data bus 840. The decrypted content data is outputted directly from the module 806 to outside of the Playback Module by passing a protected data communication path or the like.

In Host Security Manager 830 including the Playback Module 825, a static storage area (Protected Information Storage) 804 having similar characteristics to the Protected Information Storage 704 is provided. When Usage Pass reading or writing request issued by the user is received, an module for authentication (Protected Information Transmit Module) 800, the module for reception and decryption of Usage Pass 803, and the module for recovery of Usage Pass 805 and the module 801 access the storage area during executing prescribed processes. Like the Protected Information Storage 704, the storage area 804, too, is referred to as Protected Information Storage. The types and so on of data recorded in the Protected Information Storage 804 will be described later with reference to FIG. 10.

Configuration of BT Mode Protected Information Transmit Module

Figure 9:
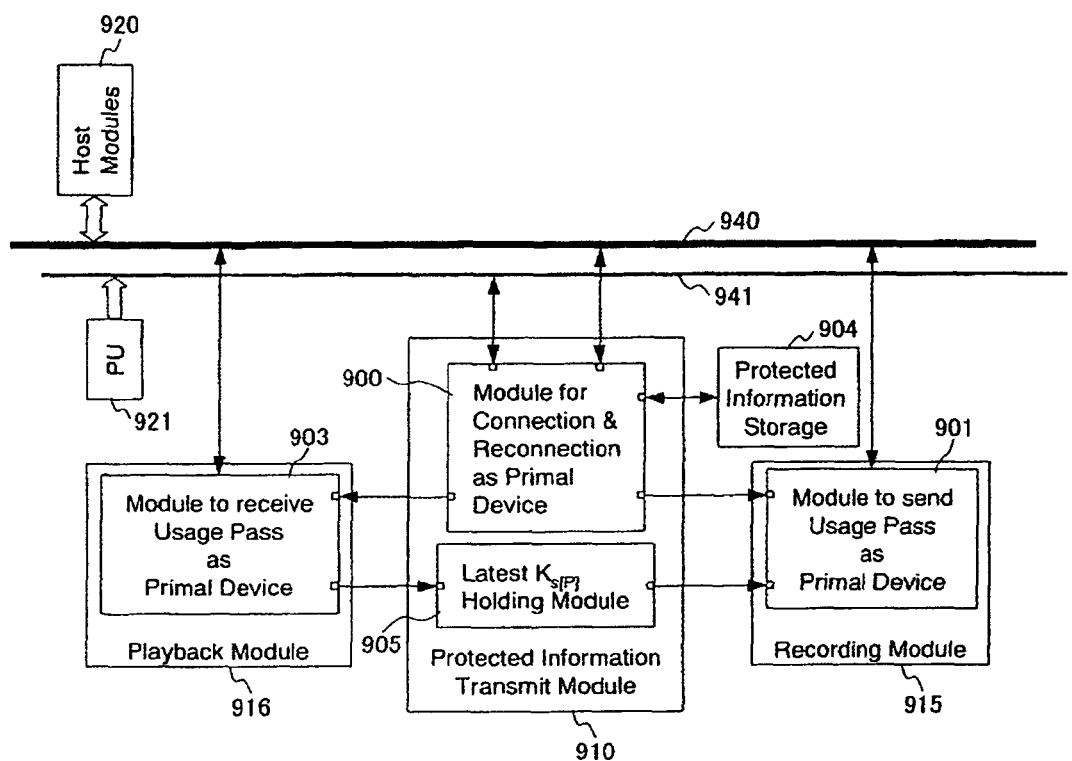
FIG. 9 is a configuration view of a functional module that realizes mutual authentication transaction and Usage Pass transfer with Hard Disk Drive in the BT mode in a recorder/player according to an example.

Referring to FIG. 9, the configuration of Protected Information Transmit Module 910 for the BT mode (corresponding to 700 in FIGS. 7 and 800 in FIG. 8) will be described. As described also in the explanation of the Recording Module and the Playback Module, in the BT mode, it is more appropriate to have a configuration in which the Protected Information Transmit Module 910 carries out mutual authentication with Inceptive Device. Thus, the Protected Information Transmit Module 910 includes a module 900 for carrying out, as Primal Device, mutual authentication transaction with Inceptive Device, and a module 905 that temporarily holds the latest Session key generated by Usage Pass receiving module 903 in Playback Module 916 and transmits it to Usage Pass transmission module in Recording Module, when necessary.

Configuration of BT Mode Protected Information Area in Recorder/Player

First, the configuration of the Protected Information Storage for the BT mode in the recorder/player will be described with reference to FIG. 10. The BT mode is a system in which the Host Security Manager 111 as a whole constantly serves as Primal Device while the Hard Disk Drive constantly serves as Inceptive Device, irrespective of the direction of transferring Usage Pass, so that Usage Pass transfer may be executed in either direction. Therefore, usually, if the Recording Module 102 and the Playback Module 103 are installed in a manner of sharing one Protected Information Storage, the static storage area provided in the recorder/player may be reduced in size.

Figure 10:
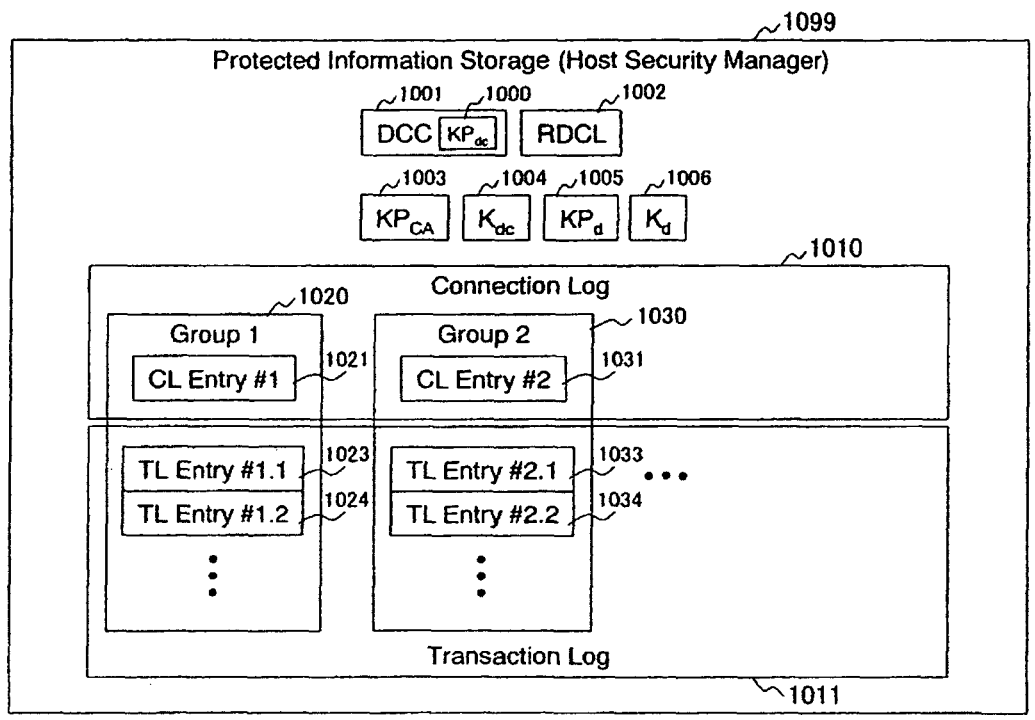
FIG. 10 is a view showing a tamper-resistant static storage area that records confidential information such as a certificate, a public key, a secret key, log information of mutual authentication transaction, and log information of Usage Pass transfer transaction, used in the BT mode in a recorder/player according to an example.

FIG. 10 shows an internal configuration in the case where Protected Information Storage is installed to have such features. It is also possible to prepare separate storage areas for the Recording Module 102 and the Playback Module 103 and to store Device Class certificate and a necessary key for mutual authentication in each storage area. In this case, each of the Recording Module and the Playback Module must include a mutual authentication execution module. Such a case is not described in this example.

1001 represents Device Class certificate (DCC). The Device Class certificate 1001 includes Device Class public key KP_dc 1000. The Device Class certificate 1001 is for certifying the validity of the Device Class public key 1000 included therein and contains a digital signature. The digital signature part is encrypted by a certificate authority secret key K_CA. 1003 represents a certificate authority public key KP_CA. 1004 represents Device Class secret key K_dc. 1005 represents a device public key KP_d. 1006 represents a device secret key K_d. These certificate and key information are embedded at the time of initial installation and usually will not be updated later unless the security system is broken.

On the other hand, information recorded in areas 1002, 1010 and 1011 represents Device Class certificate invalidation list (RDCL), Connection Log, and a Transaction Log. The information recorded in these areas is information to be updated when necessary.

RDCL is a list of invalidated Device Classes. When the security of Device Class public key KP_dc is lost, the unique number of the certificate containing this KP_dc is registered to this list. At the time of validating Device Class certificate sent from another device, it is checked whether the certificate has been falsified or not, by using the digital signature, and it is also checked whether the unique number of the certificate has been registered to the list or not. As the unique number, a serial number or the like allocated to each Device Class certificate is used.

The connection log 1010 is log information that is unique to the BT mode. One entry of the connection log is created at the completion of Connection Stage, which is initial mutual authentication transaction, and a part of it is updated at the completion of Reconnection Stage, which is re-authentication transaction (simplified mutual authentication transaction). The details of the transaction of the Connection Stage and Reconnection Stage will be described later with reference to FIG. 17 and FIG. 19.

FIG. 12 shows fields included in one entry of the connection log. That is, what is recorded in both the Host Security Manager and the Storage Security Manager is a device public key 1200 of an authentication partner device, 0th-order Session keys 1201 and 1202 generated by the partner device and the device itself during authentication transaction, Acceptable Usage Pass Type Map 1203 showing the types of Usage Pass Formats that may be received, and Partner Device Generation Number 1204 that records information specifying each other's generation.

Data recorded in the 0th-order Session key field is updated whenever the Reconnection Stage is executed.

In the Acceptable Usage Pass Type Map 1203, an Acceptable Usage Pass Type Map contained in the Device Class certificate is recorded as it is. The Acceptable Usage Pass Type Map 1203 shows "types of Usage Pass Formats that may be received". In the case where it is Usage Pass transfer source, the connection partner device determines what type of Usage Pass may be received by the counterpart device, in accordance with the Acceptable Usage Pass Type Map 1203. For example, when the Usage Pass Format of Usage Pass is "Type 0" and the Acceptable Usage Pass Type Map 1203 in the Device Class certificate transmitted from the connection partner device shows that "Type 0 is not receivable", the Usage Pass transfer source device does not execute transfer transaction of the Usage Pass.

In the Partner Device Generation Number field 1204, information specifying each other's generation is recorded, which is exchanged in the Connection Stage between the Host Security Manager and the Storage Security Manager. For example, when the generation value of the Host Security Manager and the Storage Security Manager having the functions as described in this example is 1 and the generation value of the above two managers that do not have these functions is 0, either value 0 or 1 is recorded in the Partner Device Generation Number field 1204 in accordance with the generation of the connected partner device.

The above five items are information recorded as the connection log both in the Host Security Manager and in the Storage Security Manager. In addition to these, Host Security Manager Specifier field 1205 is provided in the connection log of the Storage Security Manager. In this field 1205, information specifying the Host Security Manager as the authentication partner is recorded. An appropriate example of this may be the serial number of the Device Class certificate transmitted from this manager.

Recording of this information is not essential from the viewpoint of security. On the other hand, if this information is recorded as one field of connection log, it is possible to select a necessary entry of the connection log without trial and error in the case of executing the Reconnection Stage between the Host Security Manager and the Storage Security Manager, and the time on the transaction may be reduced.

Back to FIG. 10, the Transaction Log 1011 will be explained next. The Transaction Log is information that is recorded and updated in Usage Pass transfer transaction. However, since Usage Pass transfer may be executed only when authentication transaction (Connection Stage or Reconnection Stage) has been completed between the Host Security Manager and the Storage Security Manager, the Transaction Log must be recorded in association with Connection Log for specifying a storage module that has executed usage transfer transaction, in the Protected Information Storage in the Host Security Manager. For example, Transaction Log entries TL Entry #1.1 1023, TL Entry #1.2 1024 and so on are associated with Connection Log entry CL Entry #1 1021. Similarly, Transaction Log entries TL Entry #2.1 1033, TL Entry #2.2 1034 and so on are associated with Connection Log entry CL Entry #2 1031. Since the Transaction Log is thus associated with one of the entries of the Connection Log recorded in the Protected Information Storage 904, if the entry becomes invalid, the associated Transaction Log is invalidated at the same time.

A set including an entry of the Connection Log and associated plural entries of the Transaction Log, as shown in FIG. 10, is referred to as a group hereinafter. In FIG. 10, the set of CL Entry #1 1021, TL Entry #1.1 1023, TL Entry #1.2 1024 and so on is assumed as Group 1 1020, and the set of CL Entry #2 1031, TL Entry #2.1 1033, TL Entry #2.2 1034 and so on is assumed as Group 2 1030.

FIG. 13 shows fields included in one entry of the Transaction Log. What is recorded as the Transaction Log includes UPID (Usage Pass Identifier) 1300 of a transfer subject Usage Pass, Transfer Type (whether the device itself is the Usage Pass transfer source or the transfer destination) 1301, UR_s (Original Usage Rule enforced in Storage Module) before execution of transfer (but this is only in the case where the Primal Device is the Usage Pass transfer destination) 1302, Usage Pass (Original Usage Pass) before execution of transfer (but this is only in the case where the Primal Device is the Usage Pass transfer source) 1303, and the address (Usage Pass location) where the Usage Pass is recorded (but this is only in the case where the Primal Device is the transfer source) or the address of recording destination (but this is only in the case where the Primal Device is the Usage Pass transfer destination) 1304. These are recorded when Usage Pass transfer is executed. As these data are recorded when Usage Pass transfer is executed, even if the Usage Pass is lost both from the transfer source and from the transfer destination because of an unexpected accident or the like, the Usage Pass may be recovered.

Configuration of BT Mode Protected Information Area in Storage Device

Figure 11:
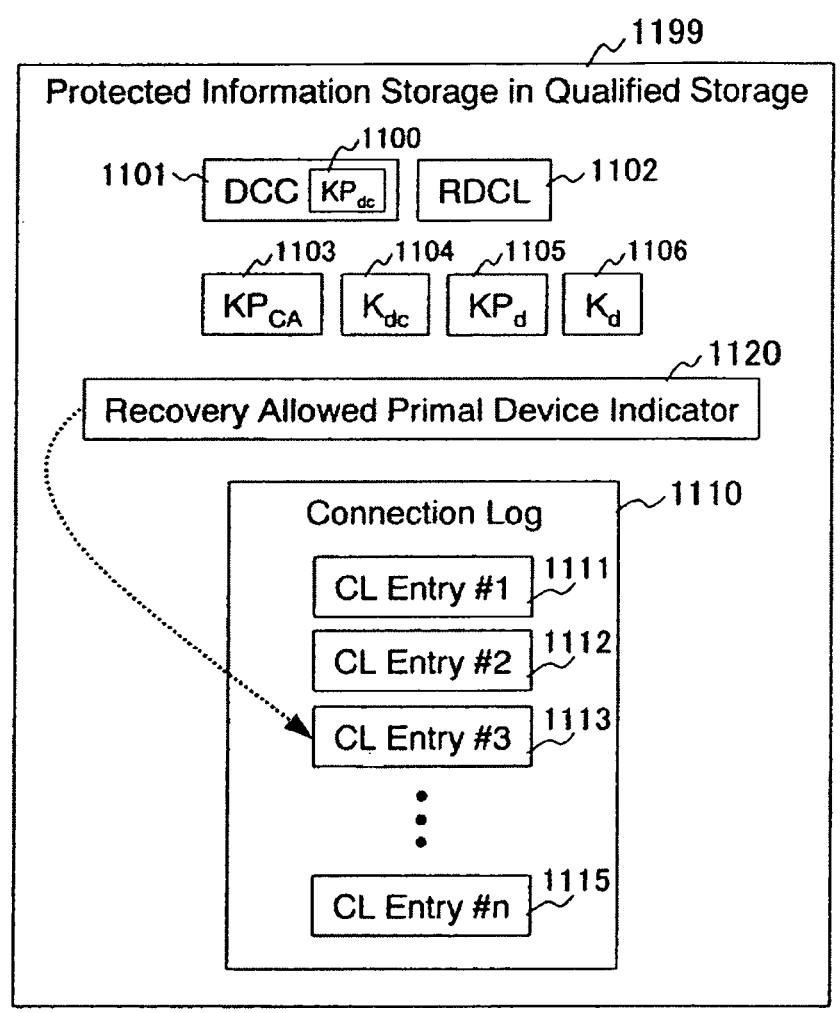
FIG. 11 is a view showing a tamper-resistant static storage area that records confidential information such as a certificate, a public key, a secret key, and log information of mutual authentication transaction, used in the BT mode in Hard Disk Drive according to an example.

Referring to FIG. 11, the configuration of Protected Information Storage for the BT mode in the Hard Disk Drive will be described. The BT mode is a system in which the Host Security Manager 111 as a whole constantly serves as Primal Device while the storage device constantly serves as Inceptive Device, irrespective of the direction of transferring Usage Pass, so that Usage Pass transfer may be executed in either direction. As shown in FIG. 11, data recorded in the Protected Information Storage provided in the Usage Pass Transfer Module include Device Class certificate (DCC) 1101 including Device Class public key KP_dc 1100, a certificate authority public key KP_CA 1103, Device Class secret key K_dc 1104, a device public key KP_d 1105, a device secret key K_d 1106, a Recovery Allowed Primal Device Indicator 1120, and Connection Log 1110. The Connection Log 1110 may contain plural entries 1111, 1112, 1113 and 1115. Each entry is generated or updated when the Connection Stage or Reconnection Stage with a different Host Security Manager is executed.

Here, the role of the Recovery Allowed Primal Device Indicator 1120 will be described. When Usage Pass transfer transaction with Host Security Manager is executed, information indicating an entry of the Connection Log 1110 generated or updated in the Connection (or Reconnection) stage executed with the same Host Security Manager prior to the Usage Pass transfer transaction is recorded as this Indicator. The entry number allocated to this entry is a typical example of it. In the case where the entry number is used, as the Reconnection Stage with Host Security Manager is executed by using the entry CL Entry #3 1113 of the Connection Log and then Usage Pass transfer with this Host Security Manager is executed, 3 is recorded as the Recovery Allowed Primal Device Indicator 1120. In other words, at the time when the Connection Stage or Reconnection Stage is completed, the Indicator is not updated. The Indicator is updated only when Usage Pass transfer transaction is executed. In the case where the second and subsequent Usage Pass transfer transaction with the same Host Security Manager is executed, the Indicator may or may not be updated. If it is updated, the Indicator is simply overwritten by the same value. In this diagram, the Recovery Allowed Primal Device Indicator is arranged separately from each entry of the Connection Log. However, this form need not necessarily be employed. For instance, one example is that each entry of the Connection Log is provided with a similarly named field, and in the case where Usage Pass transfer transaction is executed between the Host Security Manager and the Storage Security Manager, 1 is set in the entry field for the host device where the latest transfer transaction is executed, and 0 is set in the others. Even if the Recovery Allowed Primal Device Indicator is provided in this way, all the other features than the above are the same as the descriptions about the other parts and sections of this example. For example, when an entry of the Connection Log where the Recovery Allowed Primal Device Indicator is set at 1 is overwritten by new information as the Connection Stage is executed with Host Security Manager to which the device has never been connected before, if Usage Pass transfer transaction is not executed with this Host Security Manager, the Recovery Allowed Primal Device Indicator in this entry is set at 0. At this time, there is no other entry having a Recovery Allowed Primal Device Indicator set at 1.

Also, as shown in the diagram, no recording area for the Transaction Log is provided in the Protected Information Storage in the Qualified Storage 223. This means that, at the time of executing Usage Pass transfer, the storage device does not record the Transaction Log. There is an advantage that since log recording transaction is not executed, the load on the storage device at the time of Usage Pass transfer in the BT mode may be reduced to a relatively low level. This Protected Information Storage is the same as the Protected Information Storage 101 in the Host Security Manager in that the above certificate and key information are embedded at the time of initial installation and will not be updated later, and in that the Connection Log is updated in mutual authentication transaction executed between devices that are to transfer Usage Pass.

As shown in this diagram, in the case of recording the Connection Log into the Protected Information Storage in the Qualified Storage 223, plural entries may be recorded. Information recorded in individual entries is as described with reference to FIG. 12. Since this information is recorded in the Storage Security Manager, the Host Security Manager Specifier 1205 is recorded as well.

Configuration of Qualified Storage 223

Figure 14:
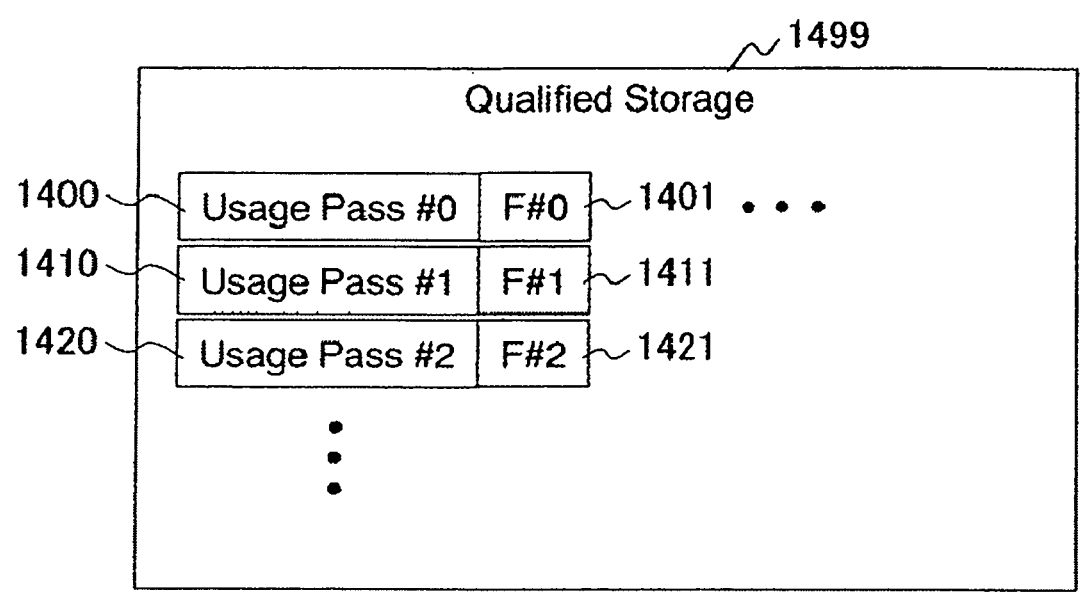
FIG. 14 is a view showing a tamper-resistant static storage area that records the Usage Pass shown in FIG. 4 and so on, in Hard Disk Drive according to an example.

Referring to FIG. 14, the configuration of the Qualified Storage 223 will be described. The Qualified Storage 223 is a section that is located in the Hard Disk Drive and records and holds Usage Pass sent from the Recording Module or another Hard Disk Drive. Recording of Usage Pass is controlled by the Qualified Storage Controller 222. The Qualified Storage 223 includes areas 1400, 1410, 1420 and so on where Usage Pass body is recorded, and areas 1401, 1411, 1421 and so on where a flag indicating the validity of the Usage Pass is recorded. Hereinafter, the flag is called validity indication flag. The validity indication flag written in 1401 shows the validity of the Usage Pass written in the area 1400. The validity indication flag written in 1411 shows the validity of the Usage Pass written in the area 1410. The validity indication flag written in 1421 shows the validity of the Usage Pass written in the area 1420. The areas where Usage Passes and the validity indication flags are recorded form pairs as described above. These areas are provided in a large number in the Qualified Storage 223, as described above. A value indicating "valid" is recorded in each validity indication flag area by the Qualified Storage Controller 222 when a valid Usage Pass is written in the area paired with the flag. Meanwhile, after Usage Pass that is once written is outputted to the Playback Module or another Hard Disk Drive, a value indicating "invalid" is recorded in the area. In the completely initial state, a value indicating "unrecorded" is recorded. Reading of Usage Pass recorded in the Qualified Storage is executed by the Qualified Storage Controller 222.

Usage Pass Transfer Transaction: Initial Process

Hereinafter, transaction executed by the recorder/player and the storage device in Usage Pass transfer according to this example will be described with reference to FIG. 15.

In carrying out Usage Pass transfer between the recorder/player and the storage device, first, the recorder/player needs to grasp the function installed in the storage device. First, as the recorder/player transmits an inquiry request to the storage device (15000), the storage device notifies the recorder/player of the function installed in the storage device itself (15001). The information to be notified of includes identifier information of the storage device allocated to the storage device, the Usage Pass transfer mode installed in the storage device, the number of entries of the Connection Log that may be recorded, information indicating which recorder/player the recorded Connection Log is generated with, and so on. The first information may be the serial number of the Device Class certificate, but more simply, is may be the serial number for manufacturing allocated to each storage device, and so on. As for the third information, the Host Security Manager Specifier recorded in each entry of the Connection Log may be used. When this information is received, the Host Security Manager decides in advance which Connection Log entry that is recorded in the storage device should be used to execute the Reconnection Stage. Also, the Host Security Manager selects which mode the Usage Pass transfer should be executed in, and notifies the module for the Usage Pass transmission or reception in the storage device, of the selected mode (15010).

Usage Pass Transfer Transaction: BT Mode Connection Stage

The BT mode is characterized in that the direction of transferring Usage Pass is not fixed and that Usage Pass may be transmitted both from the Primal Device and from the Inceptive Device. As previously described, in the BT mode, the module (Host Security Manager 111) that controls and executes mutual authentication transaction and Usage Pass transmission and reception in the recorder/player is the Primal Device, and the module (Storage Security Manager 225)

that executes mutual authentication transaction and Usage Pass transfer transaction in the storage device is the Inceptive Device. Thus, hereinafter, the Device Class certificate embedded in the Primal Device is called Primal Device Class certificate, and the Device Class public key is called Primal Device Class public key. This similarly applies to the Inceptive Device. Moreover, hereinafter, the Host Security Manager and the Storage Security Manager, which are more specific functional units that execute authentication transaction and Usage Pass transfer transaction, are not used, and the Primal Device and the Inceptive Device as higher-order devices including these security managers will be used for explanation. Of course, it should be added here that, specifically, the two managers manage and execute the authentication transaction and Usage Pass transfer transaction.

Figure 16:
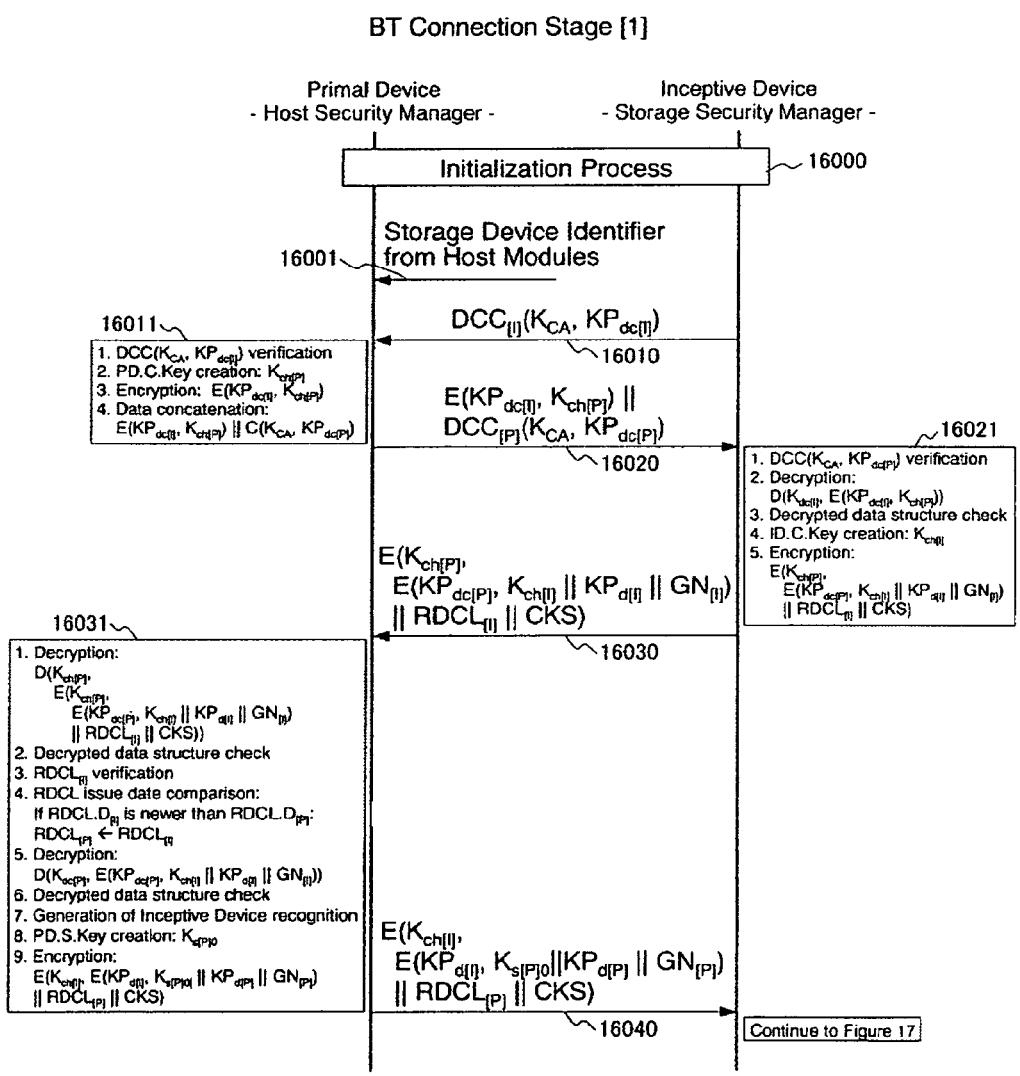
FIG. 16 It is a view showing the former half of a mutual authentication transaction sequence executed between a recorder/player and Hard Disk Drive in the BT mode according to an example.
Figure 17:
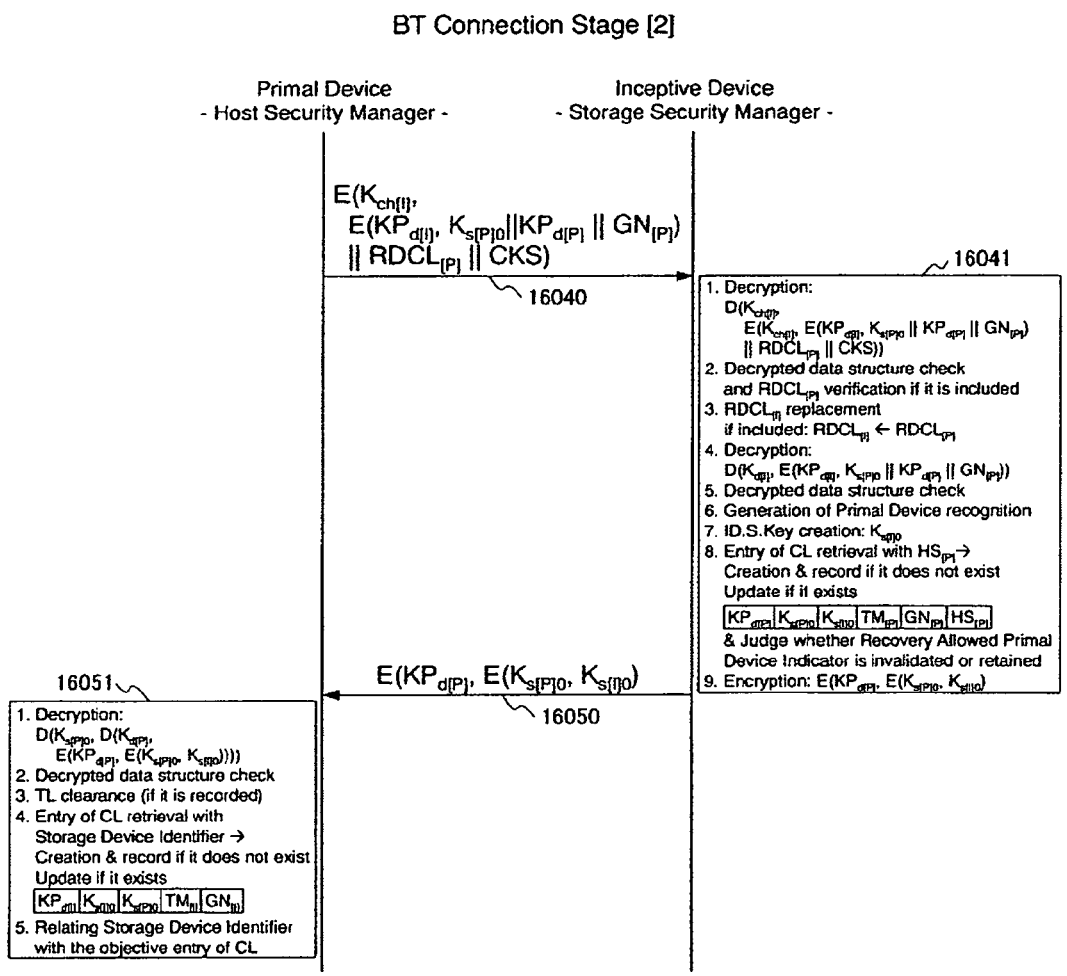
FIG. 17 is a view showing the latter half of a mutual authentication transaction sequence executed between a recorder/player and Hard Disk Drive in the BT mode, in an example.
Figure 18:
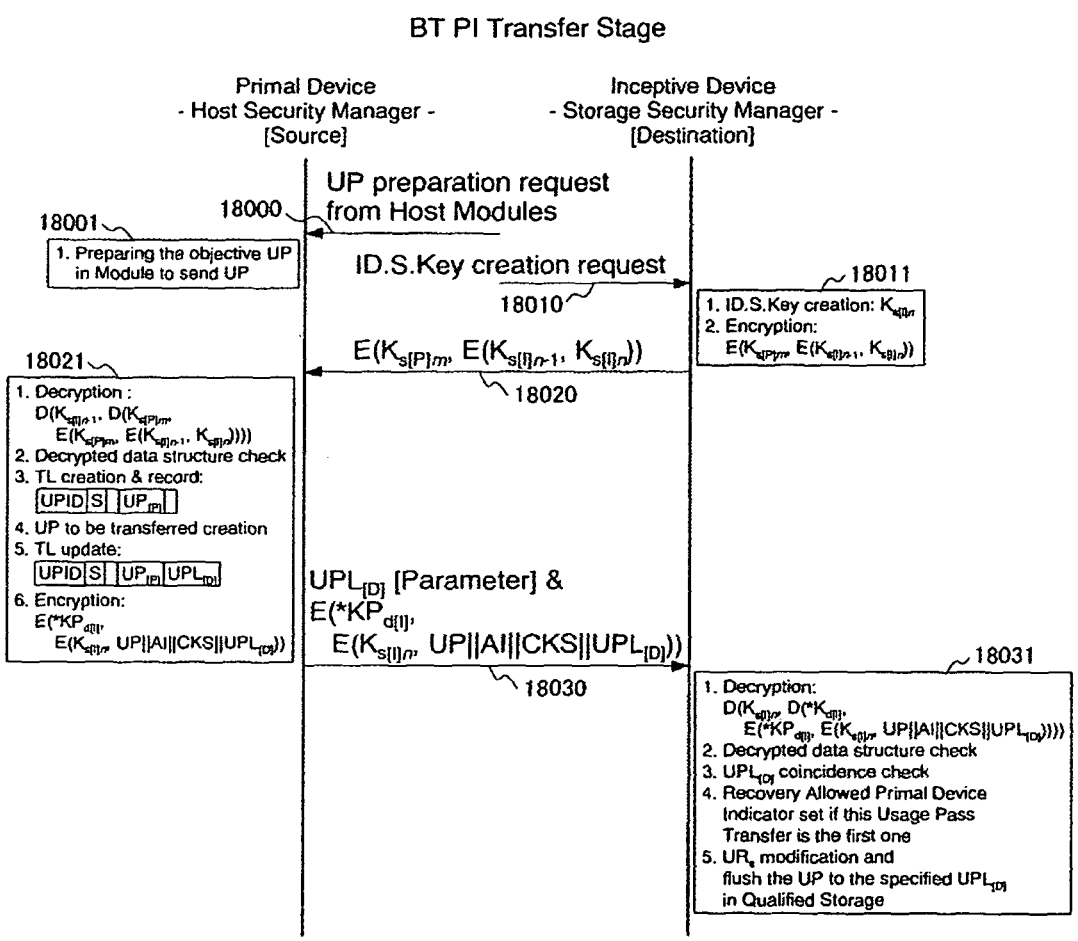
FIG. 18 is a view showing a transfer transaction sequence of Usage Pass transmitted from a recorder/player to Hard Disk Drive in the BT mode, in an example.

Hereinafter, the Connection Stage in the BT mode will be described with reference to FIG. 16 and FIG. 17. The Connection Stage refers to the transaction in which the Primal Device and the Inceptive Device execute mutual authentication, update RDCL and share a predetermined secret key.

In an Initialization Process (16000), the BT mode is set in the Primal Device and the Inceptive Device (15010). The Host Modules transmit the Storage Device Identifier acquired in 15001 to the Primal Device so that the Primal Device may determine whether the connected Inceptive Device has ever been connected thereto in the past or not (16001).

The connection module 602 in the Inceptive Device transmits the Device Class certificate DCC_[I] embedded in the Inceptive Device itself to the Primal Device (16010).

The Primal Device validates the validity of the received Device Class certificate DCC_[I]. When the validity of the received certificate is confirmed as a result of the validation, the Primal Device generates a Primal Challenge key K_ch[P] (PD.C.Key), which is a key for temporary symmetric key encryption. Then, the Primal Device encrypts the Primal Challenge key K_ch[P] by using the received Device Class public key KP_dc[I], connects Primal Device Class certificate DCC_[P] including Primal Device Class public key KP_dc[P] to the generated encrypted data, and transmits these data to the Inceptive Device (16020). The above transaction is 16011.

The Inceptive Device decrypts the received data 16020 by using its own Device Class secret key K_dc[I] and thus acquires the Primal Challenge key K_ch[P]. Then, the Inceptive Device generates a 0th-order Inceptive Challenge key K_ch[I] (ID.C.Key), which is a key for temporary symmetric key encryption. Having completed generating this key, the Inceptive Device connects the Inceptive Device public key embedded in the Inceptive Device itself and its own generation information GN_[I], and encrypts them by the received Primal Device Class key KP_dc[P]. Moreover, the Inceptive Device connects an invalidated Device Class list RDCL_[I] (Inceptive RDCL) and Checksum recorded in the Inceptive Device itself to the acquired data (that is, the data encrypted by the Primal Device Class key), and encrypts them by the received Primal Challenge key K_ch[P]. As this encryption ends, the acquired data is transmitted to the Primal Device (16030). The above transaction is 16021.

The Primal Device decrypts the received data 16030 by the Primal Challenge key, validates the completeness of the data by the Checksum, and then takes out the Inceptive RDCL RDCL_[I] from the result. Since the RDCL contains the issue date information of the data, the Primal Device compares the issue date information of the Inceptive RDCL RDCL_[I] to the issue date information of the RDCL RDCL_[P] (Primal RDCL) recorded in the Primal Device itself. If the issue date of RDCL_[I] is newer as a result of the comparison, the Primal Device overwrites RDCL_[P] with RDCL_[I]. If RDCL is updated, the Primal Device deletes or invalidates all the entries of the Connection Log recorded in the Primal Device itself. As this is done, the Connection Stage will necessarily be executed when this Storage Security Manager is connected to this Host Security Manager later. The Reconnection Stage will be described in detail later with reference to FIG. 19. Thus, in the case where a device having new RDCL is added to a closed device group, the latest RDCL may be gradually propagated. When the comparison of the RDCL issue dates is ended, the Primal Device decrypts the remaining data by the Primal Device secret key K_d[P]. Then, the Primal Device generates a 0th-order Primal Session key K_s[P]0 (PD.S.Key), which is a key for temporary symmetric key encryption. When the generation of this key is ended, the Primal Device connects the Primal Device public key embedded in the Primal Device itself and its own generation information GN_[P], and encrypts them by the Inceptive Device public key KP_d[I] received through the data 16020. Here, if it is found that the issue date of RDCL_[P] is newer as a result of the comparison of the RDCL issue date information that is previously executed, RDCL_[P] is connected to the previously encrypted data. The acquired data is encrypted by the Inceptive Challenge key K_ch[I] contained in the data 16020. As the encryption ends, the data is transmitted to the Inceptive Device (16040). The above transaction is 16031.

The following transaction will be described with reference to FIG. 17. The Inceptive Device decrypts the received data 16040 by the Inceptive Challenge key K_ch[I] and validates the completeness of the data. In the case where RDCL_[P] is contained in the decryption result, the Inceptive Device overwrites RDCL_[I] with this RDCL_[P]. In the case where RDCL update transaction is executed, as in the Host Security Manager, the Inceptive Device deletes or invalidates all the entries of the Connection Log recorded in the Storage Security Manager. Then, the Inceptive Device decrypts the remaining data by the Inceptive Device secret key K_d[I] and thus acquires the 0th-order Primal Session key. Then, the Inceptive Device generates a 0th-order Inceptive Session key K_s[I]0 (ID.S.Key), which is a key for temporary symmetric key encryption. As the generation of this key is ended, the Primal Device public key, the 0th-order Primal Session key, the 0th-order Inceptive Session key, the Acceptable Usage Pass Type Map contained in the Primal Device Class certificate DCC_[P], the generation information of the Primal Device contained in the data 16030, and the serial number of the Primal Device Class certificate DCC_[P] are recorded into their respective fields KP_d[P], K_s[P]0, K_s[I]0, TM_[P], GN_[P], and HS_[P] of the Inceptive Connection Log (CL). At this time, if there is an entry where the same value as this HS_[P] has already been recorded as HS_[P], it is necessary to invalidate this entry once and generate a new entry, or to overwrite each field of this entry. By doing so, it is possible to prevent existence of plural Connection Log entries to one Primal Device, in the Inceptive Device. Also, if all the Connection Log recording entries 1111 to 1115 in the Inceptive Device are used and information about the connection (Reconnection) stage to the Primal Device to which the Inceptive Device is about to be connected here is not recorded in any of these entries, it is necessary to record log information by overwriting one of the entries. In such a case, usually, an entry that is not the entry indicated by the Recovery Allowed Primal Device Indicator should be overwritten. However, if there is a situation where the entry indicated by this Indicator gets overwritten, information that specifies the entry of the Connection Log recorded in the Recovery Allowed Primal Device Indicator is to be deleted or invalidated. The timing of recording the Recovery Allowed Primal Device Indicator will be described in detail in the description about PI Transfer Stage and IP Transfer Stage. Then, the generated 0th-order Inceptive Session key $K\_s[I]0$ is encrypted by the 0th-order Primal Session key $K\_s[P]0$ and the Primal Device public key $KP\_d[P]$ contained in the data 16030, and is transmitted the Primal Device (16050). The above transaction is 16041.

The Primal Device decrypts the received data 16050 by the Primal Device secret key $K\_d[P]$ and the 0th-order Primal Session key $K\_s[P]0$ and thus acquires the 0th-order Inceptive Session key $K\_s[I]0$. Then, the Primal Device records the Inceptive Device public key $KP\_d[I]$, the 0th-order Inceptive Session key $K\_s[I]0$, the 0th-order Primal Session key $K\_S[P]0$, the Acceptable Usage Pass Type Map contained in the Inceptive Device Class certificate $DCC\_[I]$, and the generation information of the Inceptive Device into their respective fields $KP\_d[I]$, $K\_s[I]0$, $K\_s[P]0$, $TM\_[I]$, and $GN\_[I]$ of the Primal Connection Log (CL). The entries to be recorded are selected in a similar manner to the case of selecting entries in the Inceptive Device. That is, in the case where there is an entry related to the connected Inceptive Device, this entry is invalidated once and a new entry is generated, or each field of this entry is overwritten. To enable execution of such selection, in the case where Connection Log entry is generated, the Storage Device Identifier acquired in 15001 may be recorded somewhere in association with this entry. However, this transaction is not essential. Also, if all the entries 1021, 1031 and so on for the Connection Log are used and information about the connection (Reconnection) stage to the Inceptive Device to which the Primal Device is about to be connected is not recorded in any of the entries, log information is recorded by overwriting one of the entries. The above transaction is 16051.

The above transaction is called BT Connection Stage. When the BT Connection Stage is completed, the 0th-order Primal Session key, the 0th-order Inceptive Session key, a shared Primal Device key acquired in the process of encryption by the Primal Device public key and decryption by the Primal Device secret key, and a shared Inceptive Device key acquired in the process of encryption by the Inceptive Device public key and decryption by the Inceptive Device secret key are shared.

Usage Pass Transfer Transaction: BT Mode PI Transfer Stage

When authentication transaction is ended, Usage Pass transfer may be executed. First, the BT PI Transfer Stage will be described with reference to FIG. 18. The BT PI Transfer Stage is the transaction to transfer Usage Pass from the Primal Device to the Inceptive Device in the BT mode. In the next section, the BT IP Transfer Stage will be described in detail with reference to FIG. 18. The BT IP Transfer Stage is transaction to transfer Usage Pass from the Inceptive Device to the Primal Device.

First, in response to a request 18000 from the Host Modules, the Primal Device prepares a target Usage Pass in the Usage Pass Transfer Module 701 (18001). Then, in accordance with a request from the Host Modules, the Inceptive Device generates an n-th-order Inceptive Session key $K\_s[I]n$ (ID.S.Key) for encrypting the Usage Pass. Here, n is the number of times the BT PI Transfer Stage is executed after the completion of the Connection Stage or the Reconnection Stage (that is, $n \geq 1$). When the generation of this key is completed, the data is encrypted by the Inceptive Session key $K\_s[I]n-1$ ((n−1)th-order Inceptive Session key) generated at the time of Usage Pass transfer from the Primal Device to the Inceptive Device that is executed immediately before, and the latest Primal Session key $K\_s[P]m$ at the time, and transmitted to the Primal Device (18020). Here, m, like n, is the number of times the BT IP Transfer Stage is executed after the completion of the Connection Stage or the Reconnection Stage (that is, $m \geq 1$). The above transaction is 18011.

The Primal Device decrypts the received data 18020 by the Primal Session key $K\_s[P]m$ and (n−1)th-order Inceptive Session key $K\_\dot{}s[I]n-1$. Then, the Primal Device records UPID of the transfer subject Usage Pass, the role of the Primal Device in the transfer (transfer source S=Source) and the Usage Pass to be transmitted, into one entry of the Transaction Log. In the BT mode, only the Primal Device carries out recording of the Transaction Log. Next, Usage Pass to be actually transmitted is generated from the Usage Pass prepared in the Usage Pass transmission module. Then, after recording the recording destination address $UPL\_[D]$ (transfer destination D=Destination) of the Usage Pass in the Inceptive Device into this entry of the Transaction Log, the Primal Device connects a parameter AI indicating an application (duplication, shift, or playback), Checksum and $UPL\_[D]$ to the Usage Pass and encrypts the Usage Pass by the n-th-order Inceptive Session key $K\_s[I]n$ and the shared Inceptive Device key $*KP\_d[I]$. After the encryption is completed, the recording destination address $UPL\_[D]$ is transmitted still in the form of plaintext to the Inceptive Device, as a parameter attached to a command to transmit the target data to the Inceptive Device, and then the data containing the encrypted Usage Pass is transmitted to the Inceptive Device (18030). $UPL\_[D]$ need not necessarily be transmitted as a parameter as described above. However, in ATA, which is a typical interface architecture in the Hard Disk Drive, a writing destination address is designated as a parameter in the case of writing target data into the storage device. Therefore, when the above is done, there is an advantage that high affinity is provided in the case of installing the technology described in this example into the Hard Disk Drive. The above transaction is 18021.

The Inceptive Device decrypts the received data 18030 by the shared Inceptive Device key $*K\_d[I]$ and the n-th-order Inceptive Session key $K\_s[I]n$. The data, decrypted into plaintext, has its data structure confirmed. The confirmation of the structure is executed in accordance with the tag value and size information allocated to each field, as shown in FIG. 5. When it is confirmed that there is no problem with the data structure, it is confirmed whether $UPL\_[D]$ received as a parameter is coincident with $UPL\_[D]$ contained in the encrypted data 18030 or not. If they are not coincident, it means that $UPL\_[D]$ received as a parameter has been falsified, and therefore this transaction is stopped. If they are coincident, it is determined that the target Usage Pass has been normally received, and the Recovery Allowed Primal Device Indicator is set so as to indicate the entry of the Connection Log generated (or updated) in the Connection (or Reconnection) Stage executed as the preliminary stage of this PI Transfer Stage. The setting of the Recovery Allowed Primal Device Indicator may be executed every time the PI Transfer Stage or IP Transfer Stage is executed. However, it may be executed simply in the case where the PI Transfer Stage or IP Transfer Stage is executed for the first time after the completion of the Connection Stage or Reconnection Stage. By doing so, it is possible to reduce the process load on the Inceptive Device at the time of executing the PI Transfer Stage or IP Transfer Stage. When the above transaction is completed, $UR\_s$ of the plaintext Usage Pass is appropriately updated by a prescribed method, and after that, the Usage Pass is recorded into the Usage Pass storage area in the Inceptive Device. The above transaction is 18031. The foregoing is the BT PI Transfer Stage.

Usage Pass Transfer Transaction: BT Mode IP Transfer Stage

Figure 19:
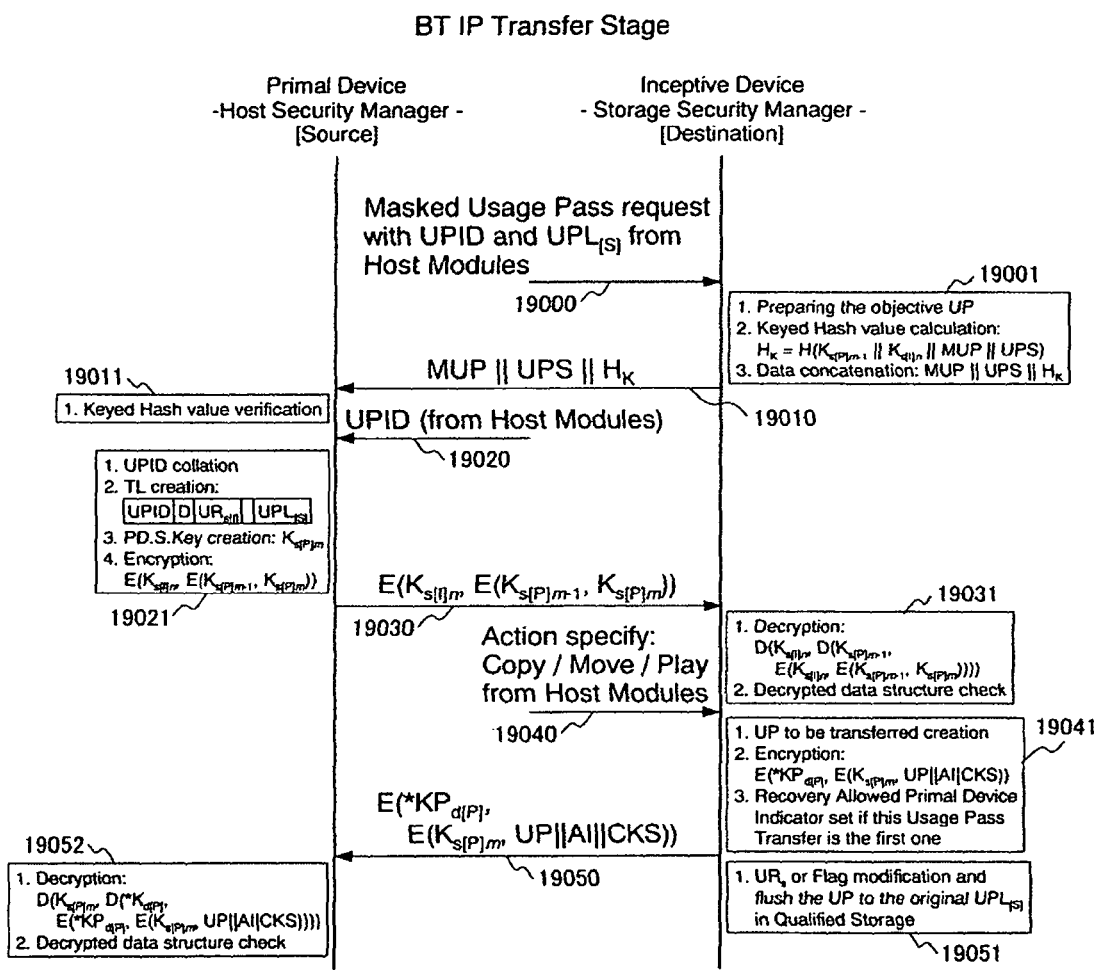
FIG. 19 is a view showing a transfer transaction sequence of Usage Pass transmitted from Hard Disk Drive to a recorder/player in the BT mode, in an example.
Figure 20:
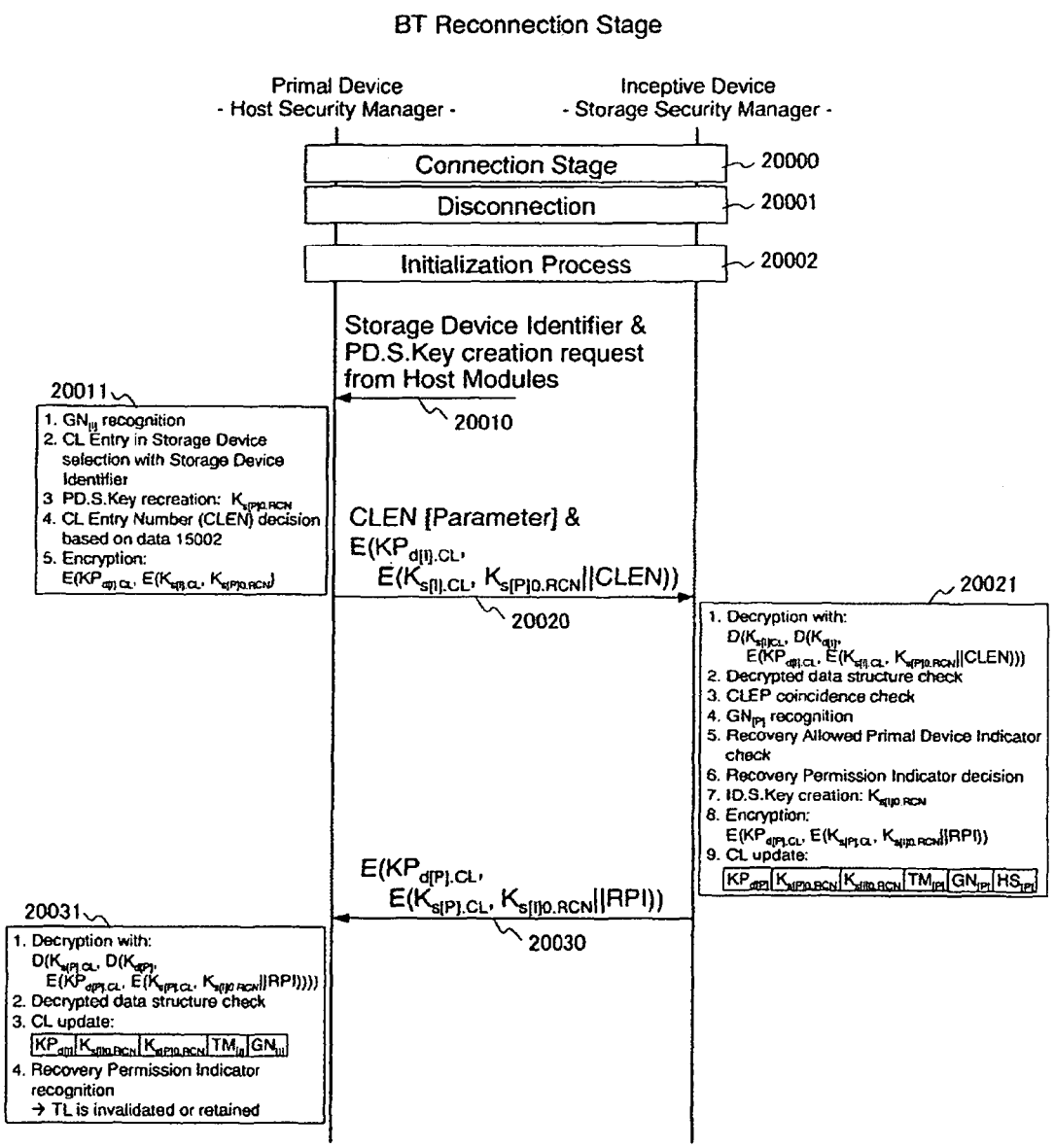
FIG. 20 is a view showing a simplified mutual re-authentication transaction sequence executed between a recorder/player and Hard Disk Drive in the BT mode, in an example.

Next, the BT IP Transfer Stage, which is Usage Pass transfer transaction from the Inceptive Device to the Primal Device, will be described with reference to FIG. 19.

First, the Host Modules notifies the Inceptive Device of the address UPL_[S] (transfer source S=Acceptable) at which the target Usage Pass is recorded, and UPID of the target Usage Pass (19000).

In response to this, the Inceptive Device prepares the target Usage Pass in the Usage Pass Transfer Module 603. Next, the Inceptive Device replaces the CIC field 403 of the Usage Pass with 0 and connects the status information (Usage Pass Status (UPS)) of the Usage Pass thereto. After that, the Inceptive Device connects the latest Primal Session key and Inceptive Session key to the data and calculates the Hash value. As the Usage Pass Status, one of the following three statuses is set: (1) the target Usage Pass does not exist (Usage Pass having different UPID is recorded, or nothing is recorded); (2) the target Usage Pass is recorded in a valid status; and (3) the target Usage Pass is recorded in an invalid status. Then, the acquired Hash value is connected to the masked Usage Pass and transmitted to the Primal Device. The Usage Pass in which the CIC field 403 is replaced with 0 is hereinafter called masked Usage Pass. The above transaction is 19001.

The Primal Device validates the Hash value in the data 19010 and validates whether this data has been free from falsification or not (19011).

In the case where it is confirmed that falsification has not been made, the Host Modules 110 transmit UPID of the transfer subject Usage Pass to the Primal Device (19020).

The Primal Device compares UPID 19020 received from the Host Modules 110 to UPID of the Usage Pass received as the masked Usage Pass 19010. When these are coincident, the Primal Device records the UPID, the role of the Primal Device itself in the transfer (transfer destination D=Destination), UR_s where the transfer subject Usage Pass is described, and the address UPL_[S] at which the Usage Pass to be transferred is recorded in the Inceptive Device, into the Transaction Log. Next, the Primal Device generates an m-th-order Primal Session key K_s[P]m (PD.S.Key), encrypts the data by the Primal Session key K_s[P]m−1 ((m−1)th-order Primal Session key) generated in the Usage Pass transfer from the Inceptive Device to the Primal Device that is executed immediately before, and the latest Inceptive Session key K_s[I]n at the time, and transmits the data to the Inceptive Device (19030). Here, the meaning of m and n is perfectly the same as the meaning explained in the description of the BT PI Transfer Stage. The above transaction is 19021.

The Inceptive Device decrypts the data 19030 by the latest Inceptive Session key K_s[I]n at the time and the (m−1)th-order Primal Session key K_s[P]m−1 (19031). Next, the Host Modules 110 notify the Inceptive Device of what type of Usage Pass transfer transaction is taken (duplication, shift, playback, and so on) (19040). In response to this, the Inceptive Device generates Usage Pass to be actually transmitted, from the Usage Pass prepared in the Usage Pass transmission module. Then, a parameter AI indicating an application (duplication, shift, or playback) and a Checksum are connected to the Usage Pass, and the data is encrypted by the m-th-order Primal Session key K_s[P]m and the shared Primal Device key *KP_d[P] (19041). Next, in the perfectly the same course as in the case of the BT PI Transfer Stage, the Recovery Allowed Primal Device Indicator is set. When the above transaction is completed, the encrypted data is transmitted to the Primal Device (19050). After transmitting the data 19050, the Inceptive Device appropriately changes UR_s and flags (1401, 1411, 1421 and so on) of the transferred Usage Pass, and re-records them (19051).

The Primal Device decrypts the received data by the shared Primal Device key *K_d[P] and the m-th-order Primal Session key K_s[P]m and confirms the structure of plaintext data. Thus, the transfer of the target Usage Pass is completed (19052). The foregoing is the BT IP Transfer Stage. [Usage Pass Transfer Transaction: BT Mode Reconnection Stage In the case where anomaly has occurred in the recorder/player and it is disconnected (20001), a process to establish connection again by simpler transaction than in the Connection Stage is the BT Reconnection Stage. The BT Reconnection Stage will be described with reference to FIG. 20.

Figure 15:
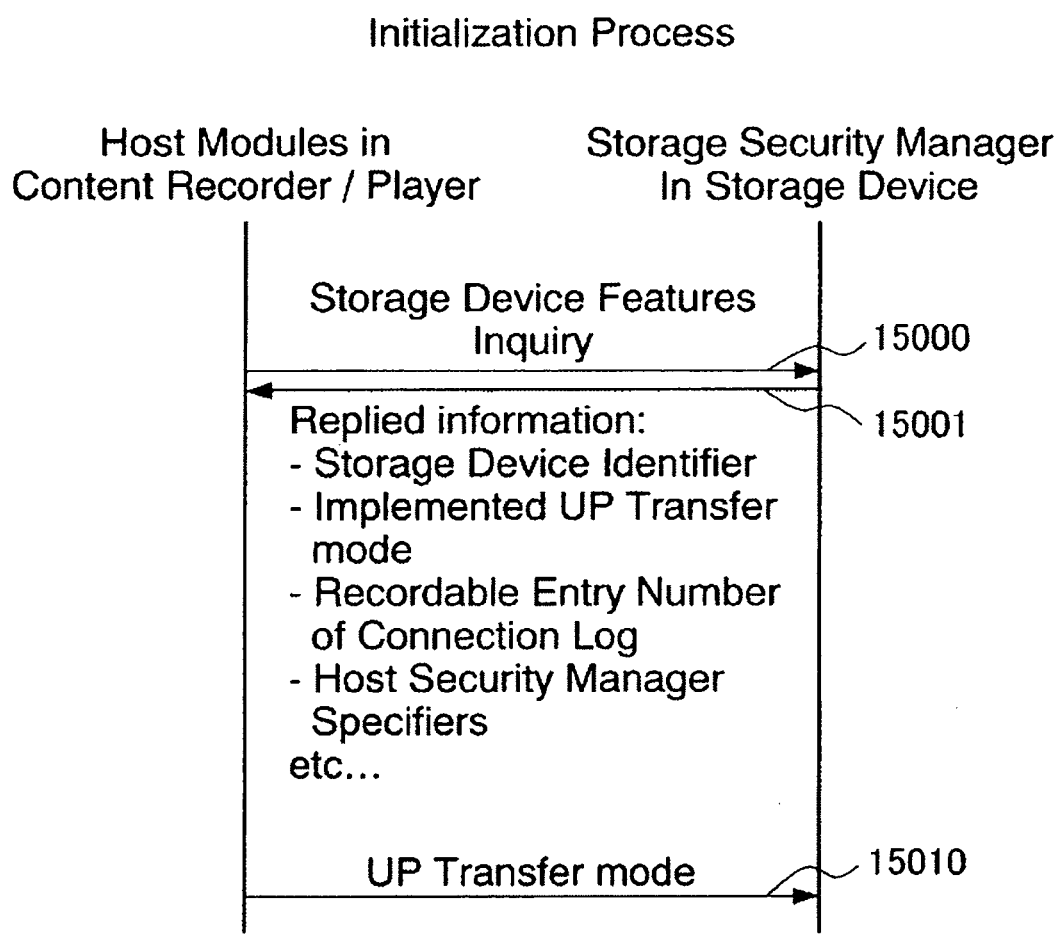
FIG. 15 is a view showing a process sequence for recognition and setting of an access mode in Usage Pass transfer transaction according to an example.

After the Initialization Process 20002 shown in FIG. 15, the Host Modules carries out notification of the Storage Device Identifier and requests for generation of a new 0th-order Primal Session key K_s[P]0.RCN (PD.S.Key) from the Primal Device (20010).

The Primal Device grasps whether the connected Inceptive Device is of a generation having the function to execute the transaction described in this example or not, in accordance with the Partner Device Generation Number of the Connection Log. If it is determined that this Inceptive Device is capable of executing the process, the Primal Device selects an entry of the Connection Log for executing this BT Reconnection Stage on the basis of the received data 20010. Then, the Primal Device generates the new 0th-order Primal Session key K_s[P]0.RCN. Next, on the basis of the information 15002 received from the Inceptive Device in the Initialization Process 2002, the Primal Device decides which Connection Log entry should be used to make the Inceptive Device execute this Reconnection Stage. The decided value is set to CLEN. After being connected to the generated key K_s[P]0.RCN, CLEN is encrypted by an Inceptive Session key K_s[I]0.CL and Inceptive Device public key K_s[P].CL recorded in the selected Connection Log entry and then transmitted to the Inceptive device (20020). Prior to this transmission, CLEN is transmitted to the Inceptive Device also in the plaintext state as a parameter attached to a command to execute the transaction 20021. This is because if CLEN is not received in the plaintext state, the Inceptive Device cannot determine which Connection Log entry's recorded key data should be used to execute decryption of the received data. The above transaction is 20011.

The Inceptive Device selects an entry of the Connection Log in accordance with the information described in CLEN as a parameter, and decrypts the received data 20020 by using its own Inceptive Device secret key K_d[I] and the inceptive Session key K_s[I]0.CL recorded in this entry. After the structure of the decryption result is confirmed on the basis of the tag and so on, it is checked whether CLEN received as a parameter and CLEN contained in the decryption result are coincident with each other or not. When the two are not coincident, there is a probability that CLEN as a parameter has been falsified in the transfer transaction 20020, even if there is no problem with the structure of the decryption result. Therefore, this transaction is stopped. When the two are coincident, it is grasped whether the connected Primal Device is of a generation having the function to execute the process described in this example, in accordance with the value recorded in the Partner Device Generation Number GN_[P] of the Connection Log. Next, it is confirmed whether the Recovery Allowed Primal Device Indicator indicates the entry of the Connection Log designated by CLEN. Then, the value of the Recovery Permission Indicator (RPI) is appropriately set and processed in accordance with the values of GN_[P], CLEN and RAPDI. To simplify the description, the values of GN_[P] and RPI and their meanings are assumed as follows. As a matter of course, their values are not limited to these.

Partner Device Generation Number (GN_[P])
 1: The connected Primal Device is of a generation having the function to execute the transaction described in this example.
 0: The connected Primal Device is of a generation prior to the generation having the function to execute the transaction described in this example.

Recovery Permission Indicator (RPI)
 1: Holding of the Transaction Log associated with this entry of the Connection Log recorded in the Primal Device is permitted.
 0: The Transaction Log associated with this entry of the Connection Log recorded in the Primal Device must be invalidated or deleted.

In accordance with the decryption of the received data 20020, the result of the two confirmation processes, and the values of the Partner Device Generation Number (GN_[P]) and the Recovery Allowed Primal Device Indicator (RAPDI), the following transaction is executed.
 (1) In the case where GN_[P]=0 and the decryption of the data 20020 and the two confirmation processes have been normally completed by using the key data recorded in the entry of the Connection Log indicated by RAPDI, the Recovery Permission Indicator is set at 1.
 (2) In the case where GN_[P]=0 and the decryption of the data 20020 and the two confirmation processes have not been normally completed by using the key data recorded in the entry of the Connection Log indicated by RAPDI, this Reconnection Stage is stopped.
 (3) In the case where G N_[P]=1 and the decryption of the data 20020 and the two confirmation processes have been normally completed by using the key data recorded in the entry of the Connection Log indicated by RAPDI, the Recovery Permission Indicator is set at 1.
 (4) In the case where GN_[P]=1 and the decryption of the data 20020 and the two confirmation processes have not been normally completed by using the key data recorded in the entry of the Connection Log indicated by RAPDI, the Recovery Permission Indicator is set at 0.

After one of the above four types of transaction is executed, the Inceptive Device generates a new 0th-order inceptive Session key K_s[I]0.RCN (ID.S.Key), except for the case where the transaction is stopped. Then, RPI is connected to the generated K_s[I]0.RCN and encrypted by using the Primal Session key K_s[P]0.CL and the Primal Device public key KP_d[P]0.CL recorded in the corresponding entry of the Connection Log. Next, this entry of the Connection Log is overwritten with the received 0th-order Primal Session key K_s[P]0.RCN and the generated 0th-order inceptive Session key K_s[I]0.RCN, and the previously encrypted data is transmitted to the Primal Device (20030). The above transaction is 20021. As in the case of the Connection Stage, a new Connection Log entry may be generated and recorded there. However, in such a case, the old entry must be invalidated or deleted.

The Primal Device decrypts the received data 20030 by using the Primal Device secret key K_d[P] and the 0th-order Primal Session key K_s[P]0.CL recorded in the entry of the Connection Log selected in 20011. Then, the acquired new 0th-order inceptive Session key K_s[I]0.RCN and the previously generated 0th-order Primal Session key K_s[P]0.RCN are recorded into this entry of the Connection Log by overwriting. The above transaction is 20031. Finally, the value of the Recovery Permission Indicator is evaluated. If this Indicator is 0, all the entries of the Transaction Log associated with this entry of the Connection Log are invalidated or deleted. If this Indicator is 1, the corresponding entry of the Transaction Log is held as it is. The above transaction is 20031. The foregoing transaction is called BT Reconnection Stage.

Usage Pass Transfer Transaction: BT Mode PI Recovery Stage

In the case where anomaly has occurred in the recorder/player and Usage Pass has been lost both from the Usage Pass transfer source and from the Usage Pass transfer destination, the Usage Pass may be recovered by carrying out the following transaction.

When the BT Connection Stage or the BT Reconnection Stage is completed, a new 0th-order Primal Session key and 0th-order inceptive Session key, a new shared Primal Device key acquired in the process of encryption by the Primal Device public key and decryption by the Primal Device secret key, and a new shared Inceptive Device key acquired in the process of encryption by the Primal Device public key and decryption by the Primal Device secret key, are shared as described above.

Figure 21:
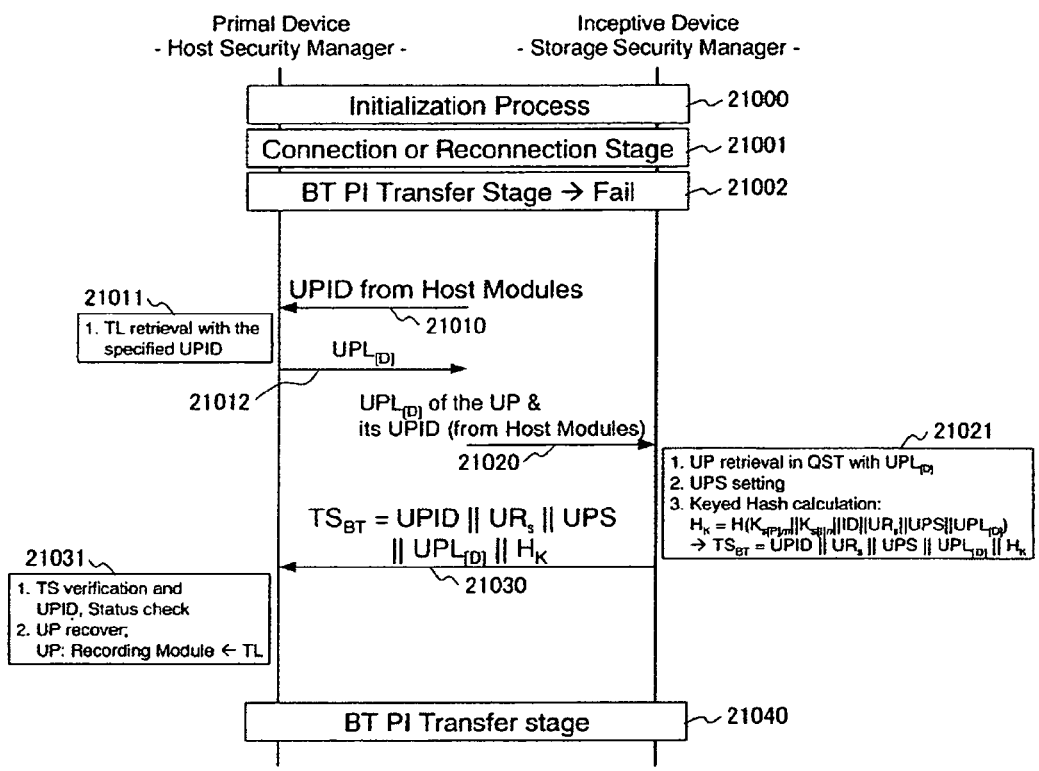
FIG. 21 is a view showing a recovery transaction sequence of a lost Usage Pass in the case where Usage Pass transmitted from a recorder/player to Hard Disk Drive in the BT mode is lost, in an example.

First, recovery transaction with respect to the BT PI Transfer Stage will be described with reference to FIG. 21. In carrying out transaction to restore the state prior to execution of transfer transaction, of Usage Pass transferred in the BT PI Transfer Stage, the Host Modules 110 first transmit UPID of the recovery subject Usage Pass to the Primal Device (21010).

The Primal Device searches for all the entries of the Transaction Log associated with the generated or updated Connection Log entry in this Connection Stage or Reconnection Stage 21001, by using this UPID (21011). When an entry of the Transaction Log including this UPID is found as a result, the recording destination address UPL_[D] of the Usage Pass (the address at which the received Usage Pass is scheduled to be recorded) in the Inceptive Device, recorded in this entry, is transmitted to the Host Modules (21012). When the Host Modules have received this address UPL_[D], the Host Modules transmit this UPL_[D] together with UPID to the Inceptive Device (21020).

The Inceptive Device accesses the Usage Pass storage area indicated by the received address and checks the recording state of the Usage Pass. Then, the result is set as Usage Pass Status. Next, the m-th-order Primal Session key K_s[P]m, n-th-order inceptive Session key K_s[I]n (these two Session keys are the latest Session keys shared at this point), UPID, the searched Usage Pass UR_s, the generated Usage Pass Status, and UPL_[D] are connected and the Hash value is calculated. Then, this UPID, this UR_s, this Usage Pass Status, this UPL_[D] and the Hash value are connected and transmitted to the Primal Device (21030). The above transaction is 21021.

The Primal Device validates the Hash value contained in the received data 21030 and confirms that the data 21030 has not been falsified and that the previously transferred Usage Pass does not exist in the Inceptive Device. After the validation is completed, the Transaction Log including the received UPID is searched again. When a target entry of the Transaction Log is found, the Usage Pass that is currently prepared in the Usage Pass transmission module 701 is overwritten with the Usage Pass prior to transfer that is recorded in this entry.

The above is the BT PI recovery stage. As this stage is completed, the Usage Pass before carrying out transmission exists in the Primal Device.

Usage Pass Transfer Transaction: BT Mode IP Recovery Stage

Figure 22:
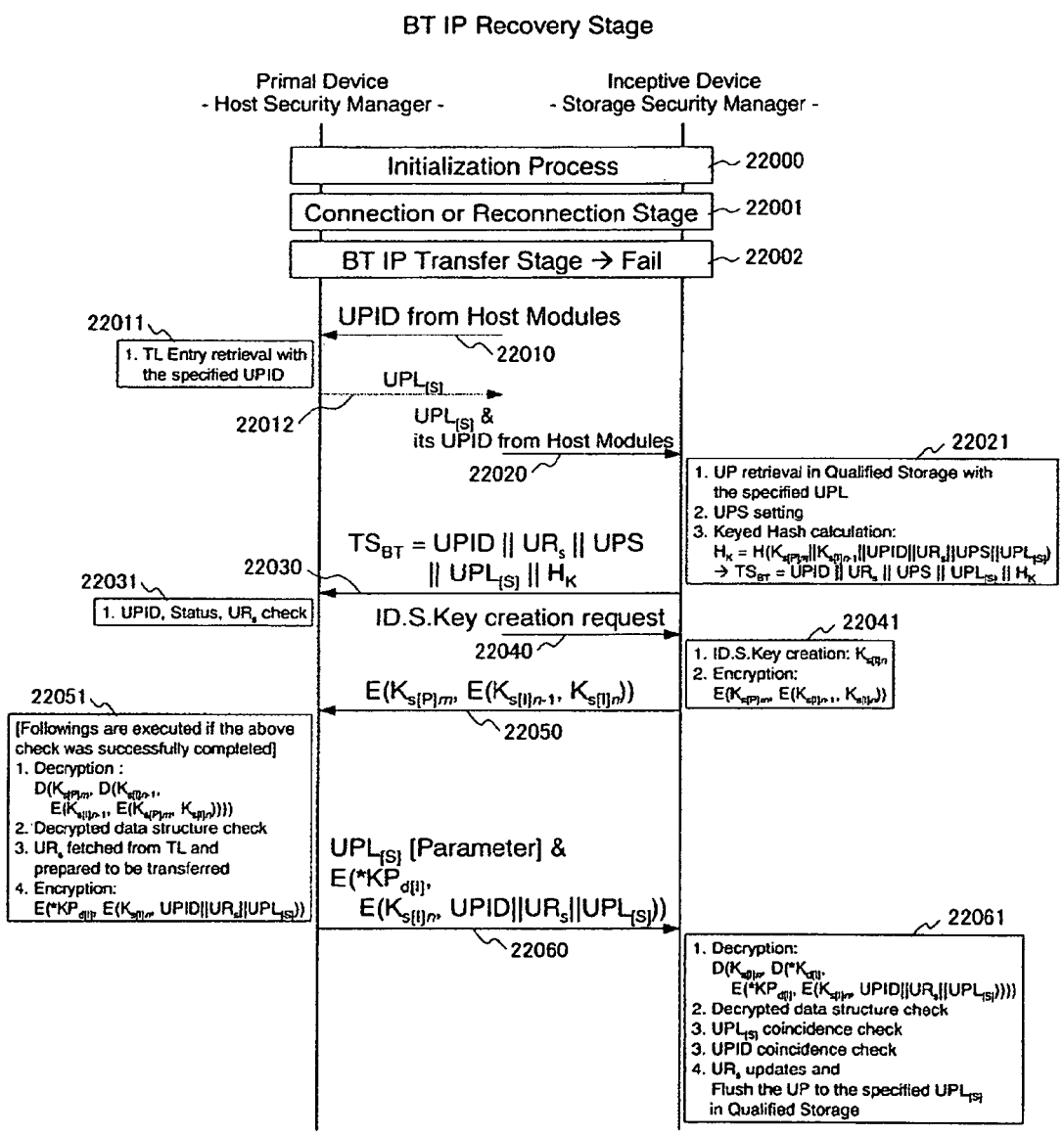
FIG. 22 is a view showing a recovery transaction sequence of a lost Usage Pass in the case where Usage Pass transmitted from Hard Disk Drive to a recorder/player in the BT mode is lost, in an example.

Next, recovery transaction of Usage Pass with respect to BT IP Transfer Stage will be described with reference to FIG. 22. In carrying out transaction to restore the state prior to execution of transfer transaction, of Usage Pass transferred in the BT IP Transfer Stage, the Host Modules 110 first transmit UPID of the recovery subject Usage Pass to the Primal Device (22010).

The Primal Device searches all the entries of the Transaction Log associated with the Connection Log entry generated or updated in this Connection Stage or Reconnection Stage 22001, by using this UPID (22011). When an entry of the Transaction Log containing this UPID is found as a result, the recording destination address UPL_[S] of the Usage Pass (the address indicating the area where the transfer subject Usage Pass is originally recorded) in the Inceptive Device that is recorded in this entry is transmitted to the Host Modules (22012). As the Host Modules have received this address UPL_[S], the Host Modules transmit this address UPL_[S] together with UPID to the Inceptive Device (22020).

The Inceptive Device accesses the Usage Pass storage area indicated by the received address, checks the recording state of the Usage Pass, and sets the result as Usage Pass Status. Then, the m-th-order Primal Session key K_s[P]m, (n−1)th-order inceptive Session key K_s[I]n−1, UPID, the searched Usage Pass UR_s, the generated Usage Pass Status, and UPL_[S] are connected and the Hash value is calculated. Then, UPID, this UR_s, this Usage Pass Status, this UPL_[S] and the Hash value are connected and transmitted to the Primal Device (22030). The above transaction is 22021.

The Primal Device validates the Hash value contained in the received data 22030 and confirms that the data 22030 has not been falsified and whether the Usage Pass that has previously been transferred to the Inceptive Device has been changed by the past transfer (transmission) transaction or not (22031).

Parallel to the above validation, the Host Modules request for generation of Session key (ID.S.Key) from the Inceptive Device (22040). When this request is received, the Inceptive Device generates an n-th-order inceptive Session key K_s[I]n. As the generation of this key is completed, the generated n-th-order inceptive Session key K_s[I]n is encrypted by the (n−1)th-order inceptive Session key K_s[I]n−1 and the m-th-order Primal Session key K_s[P]m and transmitted to the Primal Device (22050). The above transaction is 22041.

After receiving the data 22050, if it is confirmed that the Usage Pass has been changed by the execution of transmission transaction by the validation process described above, the Primal Device executes recovery transaction of the Usage Pass as described below. First, the received data is decrypted by the m-th-order Primal Session key K_s[P]m and the (n−1)th-order inceptive Session key K_s[I]n−1. Then, UPID, UR_s and UPL_[S] recorded in the corresponding entry of the Transaction Log that is found as a result of the previous search are connected there to, and the data is encrypted by the n-th-order inceptive Session key K_s[I]n and the shared Inceptive Device key *KP_d[I]. When the encryption is completed, UPL_[S] is transmitted in the form of plaintext to the Inceptive Device as a parameter appended to a command to transmit the target data to the Inceptive Device, and then this encrypted data is transmitted to the Inceptive Device (22060). UPL_[S] need not necessarily be transmitted as a parameter, as described with respect to the data 18030. However, in ATA, which is a typical interface architecture in the Hard Disk Drive, in the case of writing target data to the storage device, the writing destination address is designated as a parameter. Therefore, as this is done, there is an advantage that high affinity is achieved when the technique as described in this example is installed in the Hard Disk Drive. The above transaction is 22051.

The Inceptive Device decrypts the received data 22060 by the shared Inceptive Device key *K_d[I] and the n-th-order inceptive Session key K_s[I]n. The data, decrypted into plaintext, has its data structure confirmed. The confirmation of the structure is executed in accordance with the tag value and size information allocated to each field, as shown in FIG. 5. When it is confirmed that there is no problem with the data structure, it is then checked whether UPL_[S] received as a parameter and UPL_[S] contained in the encrypted data 22060 are coincident with each other or not. If these are not coincident, it means that UPL_[S] received as a parameter has been falsified, and therefore this transaction is stopped. If they are coincident, it is confirmed whether UPID contained in the decryption result is coincident with UPID of the Usage Pass recorded in the area indicated by UPL_[S] or not. As the coincidence of UPID is confirmed, the Usage Pass recorded in the area indicated by UPL_[S] is validated and UR_s of this Usage Pass is overwritten with UR_s contained in the decryption result. The above transaction is 22061.

The foregoing is the BT IP recovery stage. When this stage is completed, the Usage Pass prior to transmission exists in the Inceptive Device.

Timing of Invalidating Corresponding Entry of Transaction Log According to RPI Value The confirmation of RPI occurs in the Primal Device, and as its result, the deletion or invalidation of the subject entry of the Transaction Log, may not be executed at a time in the Reconnection Stage as described above. In such a case, the deletion or invalidation is completed at a certain time before transaction to take out Original Usage Pass or Original Usage Rule from the target entry of the Transaction Log is executed in the recovery stage (process 2 of 21031 in FIG. 21 and process 3 of 22051 in FIG. 22).

Reference Transaction of Usage Pass Recorded in Storage Device, by Host Modules: UP Inquiry Stage Transaction for the Host Modules to grasp information other than CIC of the Usage Pass recorded in the storage device will be described with reference to FIG. 23. This is called UP inquiry stage.

First, the Host Modules transmit a masked Usage Pass transfer request to the storage device in which the Usage Pass is recorded (23000). As this request is received, the storage device sends back the masked Usage Pass to the Host Modules 110 (23001).

The example has been described above, but embodiments of the present invention is not limited to the above. Also, embodiments of the present invention may be executed in various modifications and may also be applied to other devices and systems. Particularly, the authentication method between devices and the encryption method for content keys and usage rules at the time of transfer between devices are not limited to the BT mode and may be more general methods. In one example, the content keys and usage rules are doubly encrypted at the time of transfer. However, it may be single or may be triple or more.

Moreover, the names of commands, modules and so on described in the above examples are only exemplary and should not be limited to those examples. For instance, the Usage Pass in the above example may be called license information or confidential information in some cases.

Also, while the security management of content data in the system including the recorder/player and the Hard Disk Drive is described in the above examples, embodiments of the invention may also be applied to other systems and their component devices. That is, the devices are not limited to the recorder/player and the Hard Disk Drive as long as the characteristic function that handles control information for decrypting and managing content data according to embodiments of the present invention is provided. For example, the Hard Disk Drive may be a storage device including a semiconductor memory, and the recorder/player may be a host computer to which the storage device is connected, as long as the devices have this characteristic function.

Moreover, in another modification, the protected storage area that stores key data and so on in the above example need not necessarily be a physically tamper-resistant memory as long as logical tamper-resistance is secured.

The similar function may also be realized by the following arrangement of the structure of the Transaction Log held by the Primal Device, the recover allowed Primal Device Indicator recorded in the Inceptive Device, and the Recovery Permission Indicator transmitted from the Inceptive Device to the Primal Device with the data 20030 in the Reconnection Stage, whereas the process sequence is substantially the same as the process sequence described in the example 1.

FIG. 24 shows a structure of the Transaction Log. In this example, a field 2405 for recording the 0th-order Session key is newly provided in the Transaction Log. In this field, the 0th-order Session key shared by the Primal Device and the Inceptive Device in the Connection Stage or Reconnection Stage is recorded. The 0th-order Session key may be generated in the Primal Device or may be generated in the Inceptive Device, or may be both, if it is prescribed in advance. The timing of recording is 18021 in the case of the BT PI Transfer Stage, and 19021 in the case of the BT IP Transfer Stage, as in the other fields.

As for the Recovery Allowed Primal Device Indicator recorded in the Inceptive Device, when the BT PI Transfer Stage or BT IP Transfer Stage is executed for the first time after the completion of the Connection Stage or Reconnection Stage, the 0th-order Session key shared at the time is recorded. The 0th-order Session key to be recorded may be generated in the Primal Device or may be generated in the Inceptive Device, or may be both, as long as it is predetermined that the same 0th-order Session key as the one to be recorded into the Transaction Log is used.

As the Recovery Permission Indicator (RPI) contained in the data 20030 transmitted from the Inceptive Device to the Primal Device in the Reconnection Stage, the very information recorded as the Recovery Allowed Primal Device Indicator is set. When the data 20030 is received, the Primal Device searches all the entries of the Transaction Log associated with the entry of the Connection Log used for execution of the Reconnection Stage, for the 0th-order Session key field 2405. When, as a result, there are entries having a different value from RPI recorded in this field, Primal Device deletes or invalidates all these entries. The coincidence confirmation of the 0th-order Session key, and as a result, the deletion or invalidation of the subject entries of the Transaction Log need not be executed at a time in the Reconnection Stage. In such a case, as in the example 1, the deletion or invalidation is completed at a certain time before process to take out Original Usage Pass or Original Usage Rule from the target entry of the Transaction Log (process 2 of 21031 in FIG. 21 and process 3 of 22051 in FIG. 22) is executed in the recovery stage.

What is claimed is:

1. A content data management system, comprising:
a host apparatus comprising:
a first connection log configured to store a plurality of entries, each entry comprising authentication key data used for mutual authentication with a storage device;
a transaction log configured to store a plurality of entries comprising transaction information that is recorded during a usage pass transfer transaction, wherein each entry of the transaction log comprises encryption key data for decrypting content data and a usage rule corresponding to the content data, and wherein each entry of the first connection log is associated with one or more entries of the transaction log; and
a host processor configured to:
send, to the storage device, a storage location of an entry of a second connection log that corresponds to an entry of the first connection log having a latest authentication key data; and
send, to the storage device, at least a portion of an entry of the transaction log that corresponds to the entry of the first connection log in response to receiving a transfer permission from the storage device;
wherein the storage device comprises:
a qualified storage configured to store:
the second connection log configured to store a plurality of entries, each entry comprising authentication key data used for mutual authentication with the host apparatus; and
a device indicator stored in an indicating area that points to a latest entry in the second connection log that corresponds to a host apparatus that has executed a transfer transaction including latest authentication key data and usage rule, wherein the second connection log is stored separately from the device indicator in the qualified storage; and
a storage processor configured to:
store, in an entry of the second connection log, information indicating a particular host apparatus that has executed a latest transfer process of a latest authentication key data and usage rule, wherein the storage device uses a secret key corresponding to a public key provided by the host apparatus to decrypt the content data;
determine whether the device indicator corresponds to the latest entry in the second connection log specified by the storage location received from the host apparatus;
in response to a determination that the device indicator does not correspond to the latest entry in the second connection log specified by the storage location received from the host apparatus, send non-permission to the host apparatus; and
in response to a determination that the device indicator corresponds to the latest entry in the second connection log specified by the storage location received from the host apparatus,
send the transfer permission to the host apparatus and receive the portion of the entry of the transaction log.

2. The content data management system according to claim 1, wherein the host processor is further configured to invalidate the authentication key data and the usage rule stored in the entry of the transaction log that corresponds to the entry of the first connection log in response to receiving the non-permission from the storage device, wherein the authentication key data and the usage rule have been lost in a transfer process executed previously.

3. The content data management system according to claim 1, wherein the host processor is further configured to store a plurality of entries in the transaction log, each entry comprising transaction information that has been lost in a transfer process executed previously corresponding, respectively, to each of a plurality of encrypted content data, in response to a plurality of units of the encrypted content data being transferred.

4. The content data management system according to claim 1,
wherein the host processor is further configured to:
invalidate the authentication key data and the usage rule stored in the entry of the transaction log that corresponds to the entry of the first connection log in response to receiving the non-permission from the storage device, wherein the authentication key data and the usage rule have been lost in a transfer process executed previously; and
store a plurality of entries in the transaction log, each entry comprising transaction information that has been lost in a transfer process executed previously corresponding, respectively, to each of a plurality of encrypted content data, in response to a plurality of units of the encrypted content data being transferred.

5. A content data management method, comprising:
storing, in a first connection log on a host apparatus, one or more entries, each entry comprising authentication key data used for mutual authentication with a storage device;
causing to be stored, in a second connection log on the storage device, an entry comprising authentication key data used for mutual authentication with the host apparatus, the entry corresponding to the host apparatus;
causing to be stored, in an indicating area of a qualified storage of the storage device, a device indicator that points to a latest entry in the second connection log that corresponds to a host apparatus that has executed a transfer transaction including latest authentication key data and usage rule, wherein the second connection log is stored separately from the device indicator in the qualified storage;
storing, in a transaction log of the host apparatus, one or more entries corresponding to an entry of the first connection log, transaction information that is recorded during a usage pass transfer transaction, wherein each entry of the transaction log comprises encryption key data for decrypting content data and a usage rule corresponding to the content data, and wherein each entry of the first connection log is associated with one or more entries of the transaction log;
causing to be stored, in an entry of the second connection log, information indicating a particular host apparatus that has executed a latest transfer process of a latest authentication key data and usage rule, wherein the storage device uses a secret key corresponding to a public key provided by the host apparatus to decrypt the content data;
sending, from the host apparatus to the storage device, a storage location of an entry of the second connection log that corresponds to an entry of the first connection log having a latest authentication key data in order to mutually authenticate each other after execution of a previous authentication transaction;
determining whether the device indicator corresponds to the latest entry in the second connection log specified by the storage location sent from the host apparatus;
in response to a determination that the device indicator corresponds to the latest entry in the second connection log specified by the storage location received from the host apparatus, receiving a transfer permission;
in response to a determination that the device indicator does not correspond to the latest entry in the second connection log specified by the storage location received from the host apparatus, receiving non-permission from the storage device; and
sending, from the host apparatus to the storage device, at least a portion of an entry of the transaction log that corresponds to the entry of the first connection log in response to receiving the transfer permission from the storage device,
wherein the storage device stores, in an entry of the second connection log, information indicating a particular host apparatus that has executed a latest transfer process of a latest authentication key data and usage rule.

6. The content data management method according to claim 5, further comprising invalidating the authentication key data and the usage rule stored in the entry of the transaction log that corresponds to the entry of the first connection log in response to receiving the non-permission from the storage device, wherein the authentication key data and the usage rule have been lost in a transfer process executed previously.

7. The content data management method according to claim 5, further comprising:
invalidating the authentication key data and the usage rule stored in the entry of the transaction log that corresponds to the entry of the first connection log in response to receiving the non-permission from the storage device, wherein the authentication key data and the usage rule have been lost in a transfer process executed previously,
and
wherein the host apparatus stores a plurality of entries in the transaction log, each entry comprising transaction information that has been lost in a transfer process executed previously corresponding, respectively, to each of a plurality of encrypted content data, in response to a plurality of units of the encrypted content data being transferred.

8. A content data management system comprising: a storage device comprising:
a qualified storage configured to store:
a second connection log configured to store a plurality of entries, each entry comprising authentication key data used for mutual authentication with a host apparatus; and
a device indicator that points to a latest entry in the second connection log that corresponds to a host apparatus that has executed a transfer transaction including latest authentication key data and usage rule, wherein the device indicator is stored in an indicating area of the qualified storage, wherein the second connection log is stored separately from the device indicator in the qualified storage;
a storage processor configured to:
receive, from the host apparatus, a storage location specifying an entry in the second connection log that corresponds to an entry in a first connection log of the host apparatus;
store, in an entry of the second connection log, information indicating a particular host apparatus that has executed a latest transfer process of a latest authentication key data and usage rule, wherein the storage device uses a secret key corresponding to a public key provided by the host apparatus to decrypt the content data;
determine whether the device indicator corresponds to the entry in the second connection log specified by the storage location received from the host apparatus;
in response to a determination that the device indicator corresponds to the entry in the second connection log specified by the storage location received from the host apparatus, send a transfer permission to the host apparatus;
in response to a determination that the device indicator does not correspond to the entry in the second connection log specified by the storage location received from the host apparatus, send non-permission to the host apparatus; and
receive a portion of an entry of a transaction log corresponding to the entry in the first connection log of the host apparatus when the transfer permission is sent.

9. The content data management system according to claim 8, further comprising:
the host apparatus comprising:
the first connection log configured to store a plurality of entries, each entry comprising authentication key data used for mutual authentication with the storage device;
the transaction log configured to store a plurality of entries comprising transaction information that is recorded during a usage pass transfer transaction, wherein each entry of the transaction log comprises encryption key data for decrypting content data and a usage rule corresponding to the content data, and wherein each entry of the first connection log is associated with one or more entries of the transaction log; and
a host processor configured to:
send, to the storage device, a storage location of an entry of the second connection log that corresponds to an entry of the first connection log having a latest authentication key data; and
send, to the storage device, at least a portion of an entry of the transaction log that corresponds to the entry of the first connection log in response to receiving the transfer permission from the storage device.

10. The content data management system according to claim 9, wherein the host processor is further configured to invalidate the authentication key data and the usage rule stored in the entry of the transaction log that corresponds to the entry of the first connection log in response to receiving the non-permission from the storage device, wherein the authentication key data and the usage rule have been lost in a transfer process executed previously.

11. The content data management system according to claim 9, wherein the host
host processor is further configured to:
store a plurality of entries in the transaction log, each entry comprising transaction information that has been lost in a transfer process executed previously corresponding, respectively, to each of a plurality of encrypted content data, in response to a plurality of units of the encrypted content data being transferred; and
invalidate the authentication key data and the usage rule stored in the entry of the transaction log that corresponds to the entry of the first connection log in response to receiving the non-permission from the storage device, wherein the authentication key data and the usage rule have been lost in a transfer process executed previously.

12. The content data management system according to claim 1, wherein each entry of the transaction log comprises:
a usage pass identifier;
a transfer type indicating source or destination;
a usage rule when the transfer type is indicated as destination;
a usage pass when the transfer type is indicated as source; and
a usage pass storage location that is recorded during a usage pass transfer.

* * * * *